(12) United States Patent
Pabla et al.

(10) Patent No.: US 7,679,518 B1
(45) Date of Patent: Mar. 16, 2010

(54) MEETING FACILITATION TOOL

(75) Inventors: Kuldipsingh A. Pabla, San Jose, CA (US); Eric Pouyoul, San Francisco, CA (US); Calvin J. Cheng, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 762 days.

(21) Appl. No.: 11/168,577

(22) Filed: Jun. 28, 2005

(51) Int. Cl.
*G08B 23/00* (2006.01)
(52) U.S. Cl. ............... 340/573.1; 340/309.16; 705/8; 705/9; 709/104.1; 709/204
(58) Field of Classification Search ......... 340/540, 340/573.1, 286.11, 309.16; 705/5–9; 709/204; 707/104.1; 708/112; 715/963
See application file for complete search history.

(56) References Cited

U.S. PATENT DOCUMENTS

| | | | |
|---|---|---|---|
| 5,124,912 A | | 6/1992 | Hotaling et al. |
| 5,317,699 A | * | 5/1994 | Sugita et al. ............... 711/147 |
| 5,323,314 A | * | 6/1994 | Baber et al. .................. 705/8 |
| 5,383,112 A | | 1/1995 | Clark |
| 5,842,009 A | * | 11/1998 | Borovoy et al. ............... 707/1 |
| 5,960,406 A | | 9/1999 | Rasansky et al. |
| 5,963,913 A | | 10/1999 | Henneuse et al. |
| 5,999,208 A | | 12/1999 | McNearny et al. |
| 6,119,147 A | | 9/2000 | Toomey et al. |
| 6,363,352 B1 | | 3/2002 | Daily et al. |
| 6,434,571 B1 | * | 8/2002 | Nolte ...................... 707/104.1 |
| 6,629,129 B1 | | 9/2003 | Bookspan et al. |
| 6,865,538 B2 | | 3/2005 | Chithambaram et al. |
| 6,898,569 B1 | * | 5/2005 | Bansal et al. ................. 705/9 |
| 6,938,069 B1 | | 8/2005 | Narayanaswamy |
| 7,027,995 B2 | | 4/2006 | Kaufman et al. |
| 7,108,173 B1 | * | 9/2006 | Wang et al. ................. 235/377 |
| 2002/0198884 A1 | | 12/2002 | Eisinger |
| 2003/0027558 A1 | | 2/2003 | Eisinger |
| 2003/0046304 A1 | | 3/2003 | Peskin et al. |
| 2004/0021765 A1 | * | 2/2004 | Kubala et al. ............ 348/14.08 |
| 2005/0038690 A1 | * | 2/2005 | Hayes-Roth ................. 705/9 |

OTHER PUBLICATIONS

Leonardo Garrido and Katia Sycara, Multi-Agent Meeting Scheduling: Preliminary Experimental Results, Second International Conference on Multi-Agent Systems (IC-MAS' 96), AAAI Press, 1996.
Alice Oh, Rattapoom Tuchinda and Lin Wu, MeetingManager: A Collaborative Tool in the Intelligent Room, Proceedings of Student Oxygen Workshop, 2001.

* cited by examiner

*Primary Examiner*—Brent Swarthout
(74) *Attorney, Agent, or Firm*—Robert C Kowert; Meyertons, Hood, Kivlin, Kowert & Goetzel, P.C.

(57) ABSTRACT

A meeting facilitation tool may perform and/or facilitate the planning, scheduling, holding, and/or following up of meeting related activities. A meeting facilitation tool may schedule a meeting time by interacting with meeting participants to determine a time range during which all the participants are available. Additionally, a meeting facilitation tool may programmatically interact with calendar data to schedule the meeting with each participant. A meeting facilitation tool may also allow reviewing of information for previous meetings. Additionally, a meeting facilitation tool may configure and/or initiate teleconferencing or video conferencing as well as the audio and/or video recording of the meeting. A meeting facilitation tool may also track and completion of action items assigned during a meeting.

28 Claims, 13 Drawing Sheets

```
┌─────────────────────────────────────────────────────────┐
│ displaying meeting related information for other meetings related │
│                    to the new meeting.                  │
│                          800                            │
└─────────────────────────────────────────────────────────┘
                              │
                              ▼
┌─────────────────────────────────────────────────────────┐
│ receive user input selecting meeting related information for one or │
│                 more of the other meetings.             │
│                          820                            │
└─────────────────────────────────────────────────────────┘
                              │
                              ▼
┌─────────────────────────────────────────────────────────┐
│ including information indicating the selected meeting related │
│ information in the meeting related information for the new meeting. │
│                          840                            │
└─────────────────────────────────────────────────────────┘
```

*FIG. 8*

MEETING FACILITATION TOOL

BACKGROUND OF THE INVENTION

1. Field of the Invention

This invention relates to the field of computer implemented meeting planning and scheduling and, more particularly, to a tool for planning, scheduling, and tracking the state of meetings.

2. Description of the Related Art

The process of planning, scheduling, and holding meetings generally includes many steps that may be prone to human errors. For instance, a meeting organizer may forget to schedule the meeting location. A meeting coordinator may misplace meeting related documents, conference call telephone numbers, or long distance access codes. Additionally, the meeting coordinator may forget to remind meeting participants about the meeting or may even forget to attend the meeting himself due to distractions just prior to the meeting. Such errors often result in significant loss of productivity and efficiency. For example, meetings may have to be rescheduled due to lack of attendance or lack of meeting materials, equipment (such as slide or video projectors), or even due to a lack of an available meeting location. Determining the availability of meeting participants may be difficult and/or time consuming. Traditionally, a meeting coordinator must contact each meeting participant to determine that participant's availability during a proposed meeting time and may have to contact each participant multiple times before finding a time during which all meeting participant's are available. Similarly, determining the best method of contacting each meeting participant, either to invite them to a meeting, or to coordinate the scheduling of a meeting can be frustrating and time consuming. For instance, a meeting coordinator may attempt to reach a person via several different communication mechanisms (office phone, email, instant messenger, cell phone, etc) before actually reaching them. Increasingly, meeting planning and scheduling errors may cause third parties, such as current and potential clients, to lose confidence in an organizations ability.

SUMMARY

A meeting facilitation tool may facilitate and perform the planning, scheduling and execution of meetings and of meeting related activities. The process of planning and holding meetings includes many different activities, from generating a meeting agenda to determining a meeting time when all meeting participants can attend to disseminating meeting related materials to meeting participants. In some embodiments of the present invention, a meeting facilitation tool may be a stand-alone computer program that is configured to programmatically perform various meeting management activities. Meeting related activities may be grouped into different phases or stages. For example, meeting related activities may be divided into pre-meeting, in-meeting, and post-meeting phases. Each phase may involve distinct meeting related activities. A meeting facilitation tool may include individual tools, such as individual pre-meeting, in-meeting, and post-meeting tools, each of which may be configured to perform various meeting related activities or portions of meeting related activities, in some embodiments. In other embodiments, however, a single meeting facilitation tool may be capable of programmatically performing activities from any meeting phase.

For example, in one embodiment, a pre-meeting facilitation tool may programmatically determine and schedule a time frame during which to hold a meeting by interacting with meeting participants, via various communication mechanisms, to determine a time range during which all participants are available. Additionally, a pre-meeting facilitation tool may programmatically interact with a participant's electronically stored calendar data and/or calendar applications to schedule a meeting with the participant. Thus, the pre-meeting facilitation tool may electronically interact with various software applications and/or computer systems to plan and schedule meetings. Similarly, an in-meeting facilitation tool may facilitate or execute activities typically performed during a meeting, such as establishing conference calls or recording meeting minutes and action items. Likewise a post-meeting facilitation tool may perform activities such as tracking the progress of action items assigned during a meeting and disseminating materials from the meeting, such as meeting minutes and visual presentations, to people unable to attend the meeting.

BRIEF DESCRIPTION OF THE DRAWINGS

FIG. 8 is a flowchart illustrating one embodiment of a method for planning a new meeting based upon related meetings.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
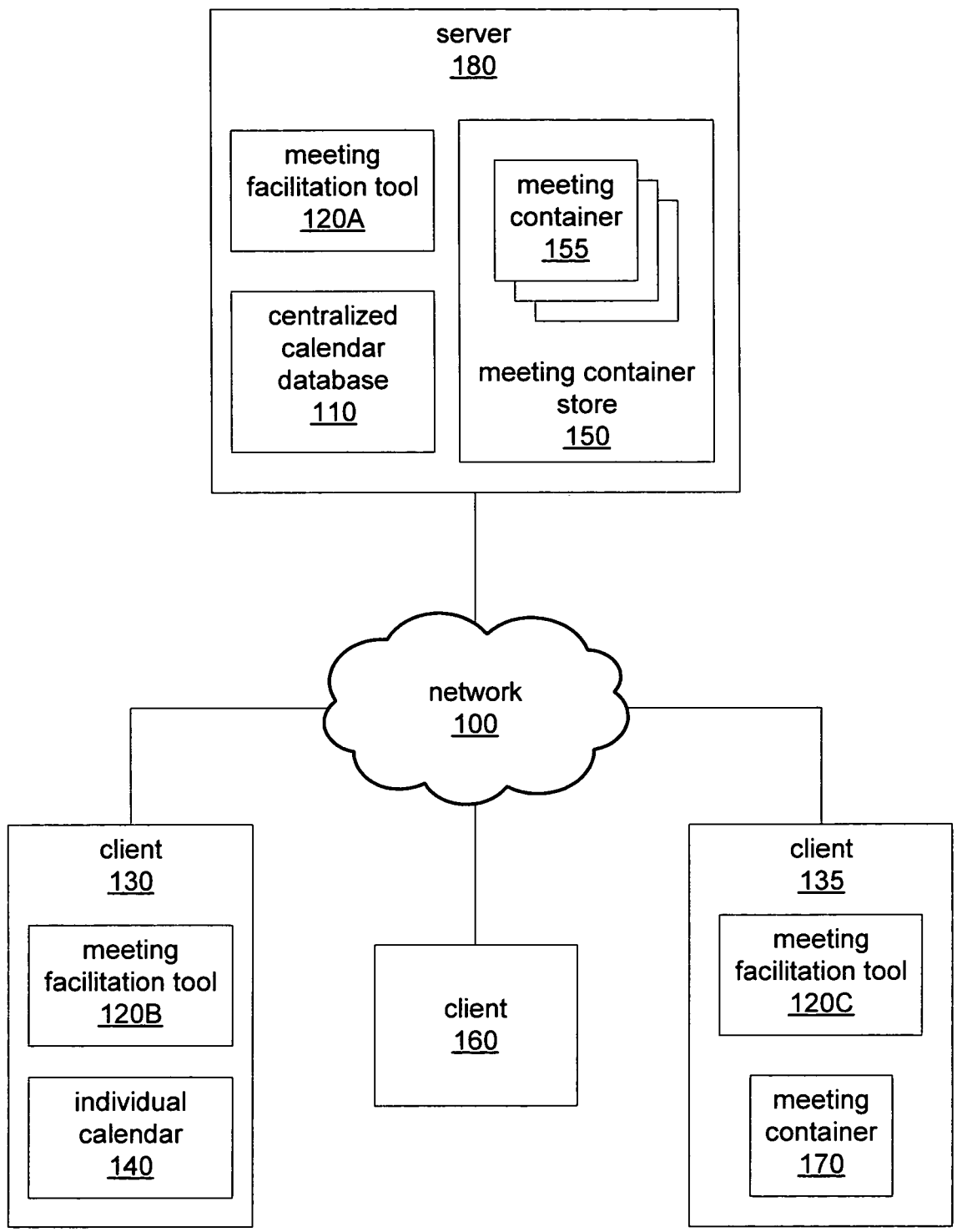
FIG. 1 is a block diagram illustrating one embodiment of a networked computer system implementing meeting facilitation tools.

FIG. 1 is block diagram illustrating a networked computing environment including the use of a meeting facilitation tool, such as meeting facilitation tool 120, according to one embodiment. As noted above, a meeting facilitation tool may programmatically perform various meeting related activities. In some embodiments, a meeting coordinator or other user planning a meeting may use a single instance of a meeting facilitation tool, such as meeting facilitation tool 120A, to plan and schedule a meeting. In other embodiments, however, multiple meeting invitees, attendees, and or other meeting participants may each use an instance of a meeting facilitation tool to learn about, and review, meeting related information for a planned meeting. Thus, multiple devices, such as server 180, clients 130, and/or client 135 may include instances of meeting facilitation tool 120. For example, as illustrated in FIG. 1, client 130 may include meeting facilitation tool 120B and client 135 may include meeting facilitation tool 120C and both meeting facilitation tools may coordinate when planning or scheduling a meeting. A meeting facilitation tool may also be configured to communicate with meeting participants that are not using or executing an instance of a meeting facilitation tool, such as clients 160 in FIG. 1.

The activities involved in planning, scheduling, holding, and following through with a meeting may be considered in three meeting phases. For example, those activities performed before the meeting actually starts, such as planning and scheduling, may be considered pre-meeting activities. A pre-meeting phase may begin with the initial decision to hold a meeting and may end when the meeting starts. Similarly, those activities performed during a meeting, such as recording meeting minutes and assigning action items, may be considered in-meeting activities, while those activities performed after the meeting is over, such as distributing meeting minutes and completing action items, may be considered post-meeting activities. An in-meeting phase may coincide with the meeting itself and a post-meeting phase may begin at the conclusion of the meeting and may not conclude until all meeting issues, such as action items assigned during the meeting, are completed. A meeting facilitation tool may automatically perform various pre-meeting, in-meeting, and post-meeting activities.

As noted above, a meeting facilitation tool may include individual tools, such as individual pre-meeting, in-meeting, and post-meeting facilitation tools, in some embodiments. In other embodiments, a single meeting facilitation tool may provide all the same functionality as individual pre-meeting, in-meeting, and post-meeting facilitation tools. Thus, as used herein, the term "meeting facilitation tool" may refer to an individual pre-meeting, in-meeting, and post-meeting facilitation tool, or may also refer to a single meeting facilitation tool providing the functionality of one or more individual pre-meeting, in-meeting, and post-meeting facilitation tools.

A meeting coordinator may rely upon a meeting facilitation tool, or a pre-meeting facilitation tool, to plan and schedule a meeting. For example, meeting facilitation tool 120 may allow a user to review information regarding previously planned and/or held meetings, according to some embodiments. In other words, a meeting facilitation tool may provide a single interface for reviewing meeting related materials and information for a number of meetings, each of which may be in a different phase of planning and execution. A meeting facilitation tool may also be used to plan a new meeting, either from "scratch" or based on another, related, meeting, according to various embodiments. In addition to planning and scheduling a meeting, a meeting facilitation tool may also facilitate and/or perform various activities related to the holding or execution of a meeting, such as by programmatically configuring and establishing tele- or video-conference calls, or by recording meeting minutes and/or action items. Additionally, a meeting facilitation tool may be configured to capture an audio or video recording of a meeting. After completion of the actual meeting, a meeting facilitation tool may perform post-meeting activities, such as the tracking and completion of action items assigned during a meeting. As noted above, in some embodiments, a single, stand-alone meeting facilitation tool may perform pre-meeting, in-meeting, and post-meeting activities. In other embodiments, however, individual pre-meeting, in-meeting and post-meeting tools may each perform activities from a single phase of meeting management.

In some embodiments, the meeting facilitation tool may be configured to only allow a specific meeting coordinator to use the meeting facilitation tool to plan and schedule a meeting. For example, in one embodiment, the meeting facilitation tool may be configured to request and authenticate a user's identity before allowing that user to request meeting management activities, such as scheduling or planning a meeting. Additionally, a meeting facilitation tool may be configured, such as by a system administrator, to utilize an organization's existing user identity and authentication mechanism to authenticate users. In some embodiments, the meeting facilitation tool may be configured to communicate with an identity framework that aggregates and stores identity information for various users. The meeting facilitation tool may also be configured, in some embodiments, to accept various forms of authentication credentials and may be configurable to accept only certain type of authentication credentials when validating a user's identity.

Alternately, multiple meeting participants may access a shared meeting facilitation tool, according to different embodiments. For instance, meeting attendees may use the meeting facilitation tool to learn about a meeting, access meeting related information, review and update action items, and/or share meeting related documents. In other embodiments, however, multiple meeting participants may each use a different instance or copy of a meeting facilitation tool to access meeting related information.

Thus, in some embodiments, a single, shared meeting facilitation tool may be used by all meeting participants, while in other embodiments, multiple meeting facilitation tools may be used by multiple meeting participants, but each tool may access a single set of shared meeting information. For example, in one embodiment, the meeting facilitation tool may store and maintain meeting related information in a single, shared location, such as on a network addressable server or on a machine available for access via peer-to-peer networking. All instances of the meeting facilitation tool may be configured to access such a single, shared set of meeting related information, according to some embodiments. In other embodiments, each instance or copy of the meeting facilitation tool may be configured to locally store meeting related information and may also be configured to coordinate with other instances of the meeting facilitation tool to update and synchronize the meeting related information.

A meeting facilitation tool may be used with both spontaneous meetings and meetings planned and scheduled well in advance. The meeting facilitation tool may also be used during the meeting, such as to facilitate telephone and video conferencing, and/or record meeting minutes and action items, among other things. In some embodiments, a separate in-meeting facilitation tool, which may be part of a larger meeting facilitation tool, may be used during the meeting.

The data and information associated with planning and holding a meeting may be captured, stored, archived and/or shared by a meeting container or object. For instance, a meeting container, such as meeting container 170, may be a computer program object, software object, or data object, that stores meeting related information, such as information about invitees/participants, location, documents, agenda, minutes, action items, audio and/or video recordings of meetings, information regarding related meetings, and/or communications related to the meeting, such as email messages, instant messages, or other communications between meeting participants or invitees. Meeting containers may be managed and maintained by the meeting facilitation tool and may provide shared access to meeting related information by multiple meeting facilitation tools and/or other meeting-aware applications. Such a meeting container or object may be considered a MeetingSpace. A MeetingSpace may, in some embodiments, be configured to transition between the various phases of a meeting planning, scheduling and execution. For example, meeting activities may be divided into pre-meeting, in-meeting, and post-meeting phases, and each phase may involve distinct meeting related activities. A MeetingSpace may initially default to a pre-meeting stage and later transition to in-meeting and post-meeting phases. The transition between these phases may be triggered by the information stored in the meeting container, according to some embodiments. As a meeting container or MeetingSpace transitions from one phase to the next, the container may store or archive information related to the meeting and may also provide a means to associate meeting related information in the context of the meeting and make such information easily accessible, shareable, and/or searchable.

Meeting containers or MeetingSpaces may be stored locally by individual instances of meeting facilitation tools, or alternately may be stored in a single location, such as meeting container store 150 that may store multiple individual meeting containers 155, according to some embodiments.

A meeting facilitation tool may generate and access meeting container objects, or MeetingSpaces, in order to capture, store, archive and access meeting related information. Additionally, multiple meeting containers, storing information for a group of related meetings, may be linked together in order to facilitate the accessing and sharing of information among the various related meetings. For instance, information regarding a follow-up meeting may be stored in a meeting container object linked to a meeting container object storing information regarding the original meeting.

A meeting facilitation tool may also communicate with or interact with other applications useful when performing meeting related activities. For instance, in some embodiments, a meeting facilitation tool may programmatically interact with calendar programs to schedule meeting times. Thus, a meeting facilitation tool may interface with a meeting invitee's calendar application, or calendar database, to record or schedule a meeting. In some embodiments, a meeting facilitation tool may be configured to programmatically determine, such as via a calendar program, the availability of a meeting invitee. A meeting facilitation tool may communicate with calendar applications, such as individual calendar 140 on client 130, configured to directly access and understand meeting related information. For example, a calendar program may be configured to display a link to a meeting container or MeetingSpace and may also be able to access meeting information from a meeting container. Additionally, MeetingSpace aware calendar programs may be configured to launch a meeting facilitation tool to edit/view information from a meeting container for a scheduled meeting.

In some embodiments, a meeting facilitation tool may itself include calendar functionality similar to that provided by stand-alone calendar applications and thus may maintain scheduling and availability information for meetings and/or meeting participants. In yet other embodiments, a meeting facilitation tool may be configured to directly access calendar data without interfacing with a specific calendar application. For instance, meeting facilitation tool 120A on server 180 may, in one embodiment, be configured to access information from an availability service or that is stored in centralized calendar database 110, which may maintain appointment and availability information for multiple people and other entities.

In some embodiments, a meeting facilitation tool may be configured to programmatically access or interact with a service or framework that provides availability information for users. Such a framework is described in U.S. patent application Ser. No. 10/875,759, titled "Identity Framework with Integrated and Aggregated Presence across Multiple Communication Channels", filed on Jun. 24, 2004, and incorporated herein by reference in its entirety. In general, an identity framework may expose identity, availability, reachability and communication facilities as services that may be accessible to both local and remote software components. A meeting facilitation tool may access an identity framework to obtain availability and reachability information for meeting participants, according to some embodiments. Identity frameworks may reside on multiple network devices and may communicate and exchange identity and communication related information about any number of users or identities.

Additionally, an identity framework may be able to receive or gather identity, availability, reachability or communication awareness information for an identity from other applications or processes executing on remote devices. For example, in one embodiment, an identity framework may be configured to request and receive identity or communication awareness information from an online company directory, or from peer-to-peer communication services. Thus, in some embodiments, a meeting facilitation tool may be configured to supply information regarding meetings to allow an identity framework or service to update availability information for meeting participants accordingly. Communication awareness information may also include information regarding or related to an identity's presence, availability, reach-ability, or accessibility, both in general and regarding specific communication mechanisms or channels. Additionally, communication awareness information may also include identity related information such as names, nicknames, aliases, addresses, telephone numbers, calendar information and other communication related information.

According to certain embodiments, an identity framework may receive a request from a local application, such as a meeting facilitation tool, for communication awareness information for a remote user or identity. In turn, the identity framework may request the communication awareness information for the remote user from a remote system associated with the remote user. In addition to information about an identity's presence, availability, accessibility, and reach-ability, such communication awareness information may also include, according to one embodiment, information indicating one or more connectivity models or communication mechanisms for communicating with the remote user. After receiving the communication awareness information from the remote system, the identity framework may provide the communication awareness information to the local application, in one embodiment. In addition, an identity framework may receive a request to initiate communication with the remote user and may initiate the communication through a connectivity model included in communication awareness information for the remote user received from a remote system associated with the remote user. Therefore, in some embodiments, a meeting facilitation tool may utilize an identity framework to communicate with meeting participants, such as to send meeting invitations, distribute meeting related materials and/or to initiate a teleconference during a meeting.

Figure 2A:
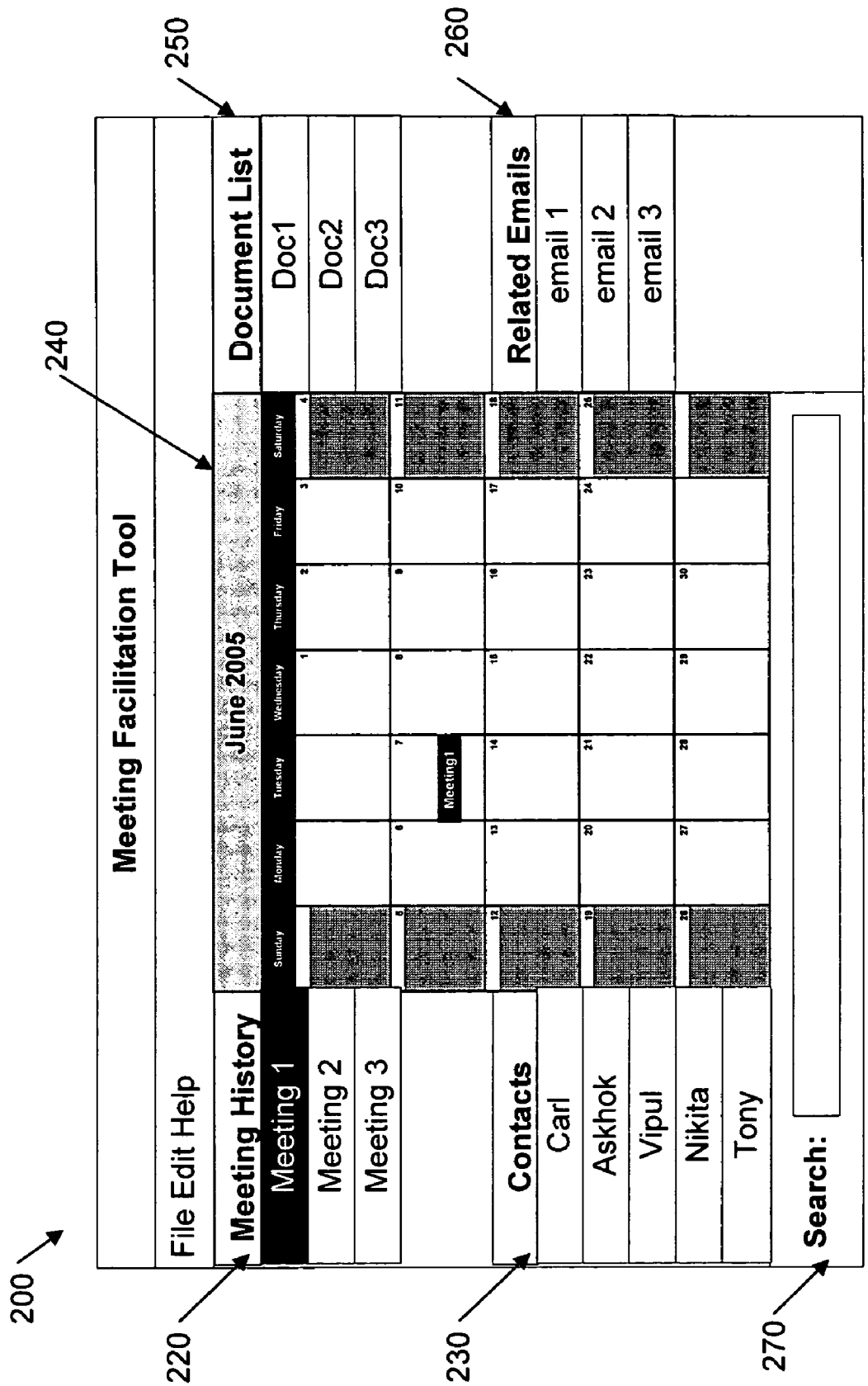
FIG. 2A illustrates an exemplary user interface for browsing meeting objects, according to one embodiment.

As the foregoing discussion makes clear, a meeting facilitation tool may provide for an orderly and efficient way to view and/or browse meeting related information. For example, FIG. 2A illustrates one exemplary user interface 200 allowing users to view and browse meeting related information, according to one embodiment. For instance meeting facilitation tool 120 may include a user interface allowing a meeting coordinator, or other user, to access, review and/or modify meeting related information for one or more meetings. The user interface illustrated in FIG. 2A may be part of a meeting facilitation tool, such as meeting facilitation tool 120, or in some embodiments may be part of a separate stand-alone meeting browser application that is configured to communicate and interact with meeting facilitation tool 120. As will be discussed later, a meeting facilitation tool may, in some embodiments, be configured to allow users to update meeting-related information through a user interface similar to the one illustrated in FIG. 2A.

A user interface for browsing meeting related information, as may be provided by a meeting facilitation tool, may include various user interface elements, each presenting or displaying different types of meeting related information, according to various embodiments. For instance, the user interface illustrated in FIG. 2A includes a calendar view 240, a contact list 230, a meeting history list 220, a document list 250 and a related email message list 260, according to one embodiment. A user browsing meeting related information may select a meeting from meeting history list 220, such as by clicking a mouse or other pointing device, and the meeting browser may display information regarding the selected meeting. For example, contact list 230, document list 250 and related email message list 160 may each be configured to display data related to a meeting selected in meeting history list 220, in some embodiments. In some embodiments, contact list 230, document list 250, and related email message list 260 may be configured to display items for more than one meeting. For instance, in one embodiment, if no meeting is selected in meeting history 220, document list 250 may be configured to display all documents related to all meetings in meeting history 220. In another embodiment, contact list 230 may be configured to include all invitees, coordinators and/or other meeting participants of all meetings in meeting history 220.

In one embodiment, calendar view 240 may illustrate all meetings that meeting facilitation tool 120 has knowledge of. In other embodiments, calendar view 240 may only display meetings to which the user has been invited or is a participant of. In some embodiments, calendar view 240 may also display appointment, availability, or calendar related information for the user, while in other embodiments only meetings may be displayed in calendar view 240.

Meeting facilitation tool 120 may also display documents, emails and or other meeting related information in a user interface. For example, meeting facilitation tool 120 may display a document list 250 including documents related to one or more meetings. In one embodiment, document list 250 may display documents related to a meeting listed in meeting history 220 and selected by a user. Thus, document list 250 may dynamically change based on the specific meeting selected by the user, in some embodiments. In other embodiments, document list 250 may include all documents related to all meetings in meeting history 220. In one embodiment, a user may configure what documents are included in document list 250.

Meeting history 220 may, in some embodiments, be configured to display all meetings for which meeting facilitation tool 120 has information. In other embodiments, only those meetings to which the current user was a participant may be included in meeting history 220. In yet other embodiments, all meetings to which the current user was a participant and all other meetings related to those meetings, whether or not the current user was a participant, may be included in meeting history 220. In yet other embodiments, meeting history 220 may include only meetings that the current user planned, scheduled, and/or called. In some embodiments, meeting facilitation tool 120 may be configured to allow a user to determine or specify whether all meetings, only those meetings the user participated in, or only those meetings the user coordinated should be included in meeting history 220.

Similarly, meeting facilitation tool 120 may display a list of related emails 260 including emails exchanged between meeting participants regarding one or more particular meetings. As with document list 250, meeting facilitation tool 120 may dynamically update the contents of related email list 260 according to a currently selected meeting in meeting history 220. Contact list 230 may also be dynamically updated based upon a currently selected meeting in meeting history 220. In one embodiment, contact list 230, document list 250 and related email list 260 may display all instances of appropriate data if no meeting is selected in meeting history 220 and may filter their respective contents based on a selected meeting.

Meeting facilitation tool 120 may also include search, filter, and/or sorting capabilities in user interface 200. For instance, user interface 200 may include search bar 270 that may allow a user to search for a particular meeting via a keyword search. User interface 200 may then filter the meetings displayed in meeting history 200 to only those meetings that match search criteria entered in search bar 270. Search bar 270 may include, various user interface elements for searching, filtering and/or sorting such as text bar for entering keyword, user interface elements allowing the user to specify date and/or time ranges or other options related to searching for particular meetings. While FIG. 2A illustrates a single text box for making simple text based search queries, other embodiments may include much more sophisticated search capability including many more search options. In general a meeting facilitation tool, such as meeting facilitation tool 120 may include any sort of search and sorting capabilities. For instance, the respective contents of contacts 230, meeting history 220, document list 250, and related email list 260 may be sorted via a user interface of meeting facilitation tool 120, in one embodiment.

A meeting browser or meeting facilitation tool may be configured to allow a user to select an item from one of the related data lists, such as a document from document list 250, and the tool may in response open the document in an appropriate program. For example, a user may select a text document and meeting facilitation tool 120 may programmatically launch a word processing application and load the selected document in the word processing application. As is common with user interfaces, each list of items may include a means for scrolling the list to accommodate more items than would fit otherwise.

Additionally, a meeting facilitation tool may include a calendar view 240 graphically showing when a meeting is planned (for meetings in the pre-meeting phase) or when a meeting was held (for meetings in the post-meeting stage). As is common in user interfaces, the calendar view may be configured to show different levels of detail, such as hours, days, weeks, months, or even years. Calendar view 240 may be configured to graphically, as well as textually, display the date and time for a meeting, such as meeting 1, as illustrated in FIG. 2A. Additionally, calendar view 240 may be configured to show multiple meetings. As with meeting history 220 and document list 250, discussed above, meeting facilitation tool may, in some embodiments, be configured to allow a user to specify which meetings should be displayed in calendar view 240.

Meeting facilitation tool 120 may also use calendar view 240 to display availability information for individual meeting invitees or participants. For example, meeting facilitation tool 120 may allow a meeting coordinator to manually select a meeting time by reviewing availability information for certain (or all) meeting invitees and/or participants.

Please note that the form and arrangement of the user interface illustrated by FIG. 2A is merely one example and that other embodiments may present meeting related information in any of numerous other ways. Please note that while the user interface illustrated by FIG. 2A includes certain types of information in various user interface areas, such as windowpanes or sub-windows, arranged in an exemplary manner, other embodiments may include additional or fewer types of information displayed and arranged differently than illustrated in FIG. 2A.

Figure 2B:
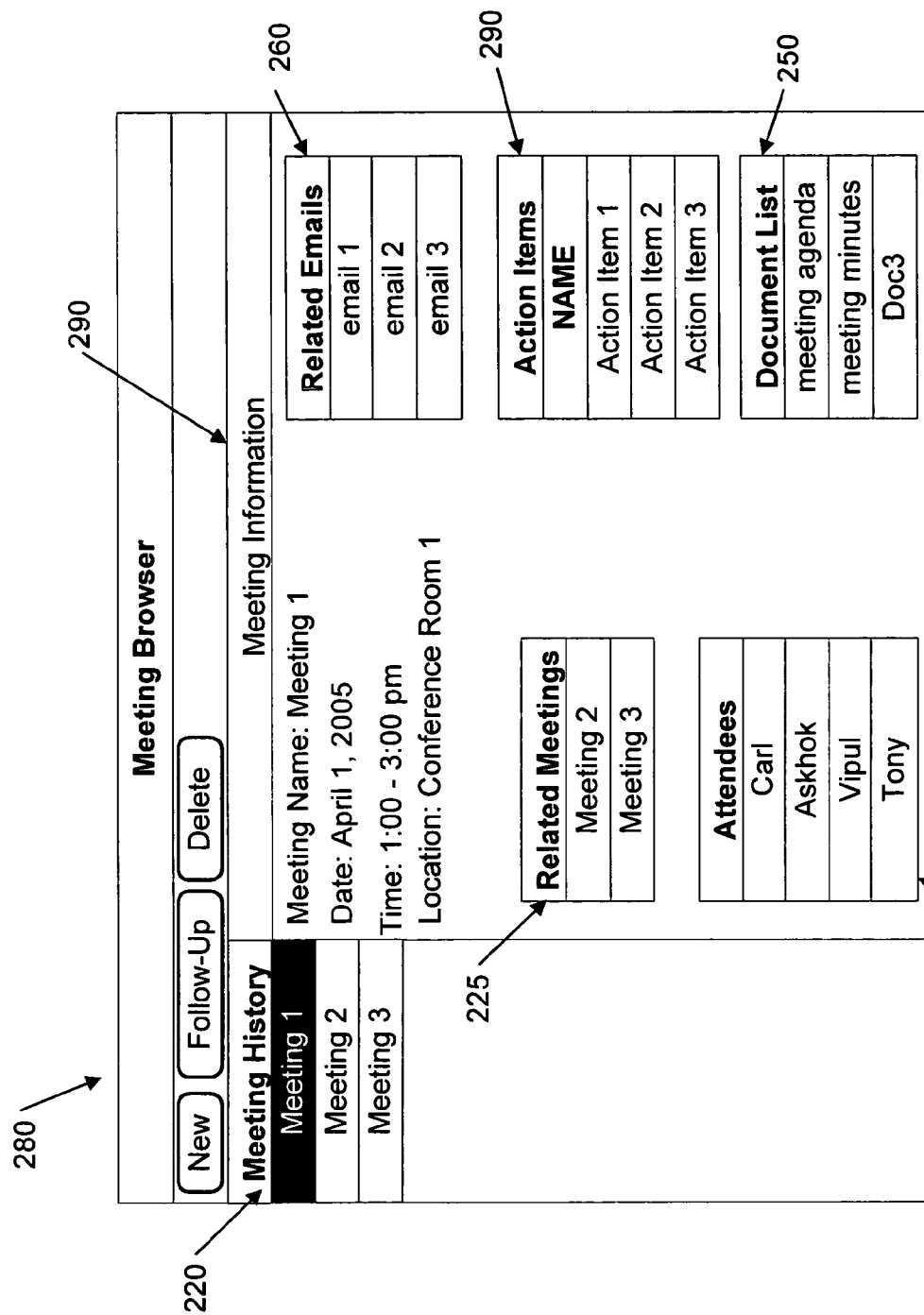
FIG. 2B illustrates another exemplary user interface for browsing meeting objects, according to one embodiment.

FIG. 2B illustrates another exemplary user interface for displaying and browsing meeting related information. As illustrated by FIG. 2B user interface 280 includes many similar elements as were included in user interface 200, described above. User interface 280 however, also includes meeting information view 290, which displays various types of meeting related information. For example, meeting information view 290 may include a meeting name, the date and time for the meeting, and a meeting location. Meeting information view 290 may also include a list of related meetings 225, related emails 260, and documents 250. Additionally, meeting information view 290 may also include a listing of action items 290, either prerequisite action items to be accomplished before the meeting or follow-up action items to be completed after the meeting. In some embodiments, related meetings may share a set of action items. For instance, the items assigned during one meeting may be prerequisite action items for a follow-up meeting, according to one embodiment.

Please note that in some embodiments, a meeting facilitation tool may be configured to present a combination of user interface 200 and user interface 280 or display various elements from each user interface. FIGS. 2A and 2B are merely examples of the types of user interfaces that may be presented by meeting facilitation tool 120 and in other embodiments meeting facilitation tool 120 may display other, different user interfaces.

Additionally, a meeting facilitation tool, such as meeting facilitation tool 120A, may store or archive meeting related information in one or more meeting containers, or MeetingSpaces, such as meeting container 155 in meeting container store 150. Such a meeting container may be a computer program, software or data object storing meeting related information and may be shared, via network 100, among various instances of meeting facilitation tool 120. As noted above, meeting containers, or MeetingSpaces may be managed and maintained by meeting facilitation tool 120 and may provide shared access to meeting related information by multiple meeting facilitation tools and/or other meeting-aware applications. For instance, in one embodiment, a meeting coordinator using client 130 may utilize meeting facilitation tool 120B to plan and schedule a meeting and meeting related information, such as invitees, agendas, and meeting schedule, may be stored in meeting container 155 in meeting container store 150 on server 180. A meeting invitee or attendee, such as one using client 135 may use meeting facilitation tool 120C to access and review the meeting-related information in meeting container 155 from meeting container store 150 on server 180. Alternatively, according to another embodiment, meeting facilitation tool 120 may receive meeting related information from another instance of meeting facilitation tool 120 and in response may create a local copy of a meeting container. For instance, meeting facilitation tool 120C may receive meeting container 155 from meeting facilitation tool 120A and may create local meeting container 170 on client 135.

Figure 3:
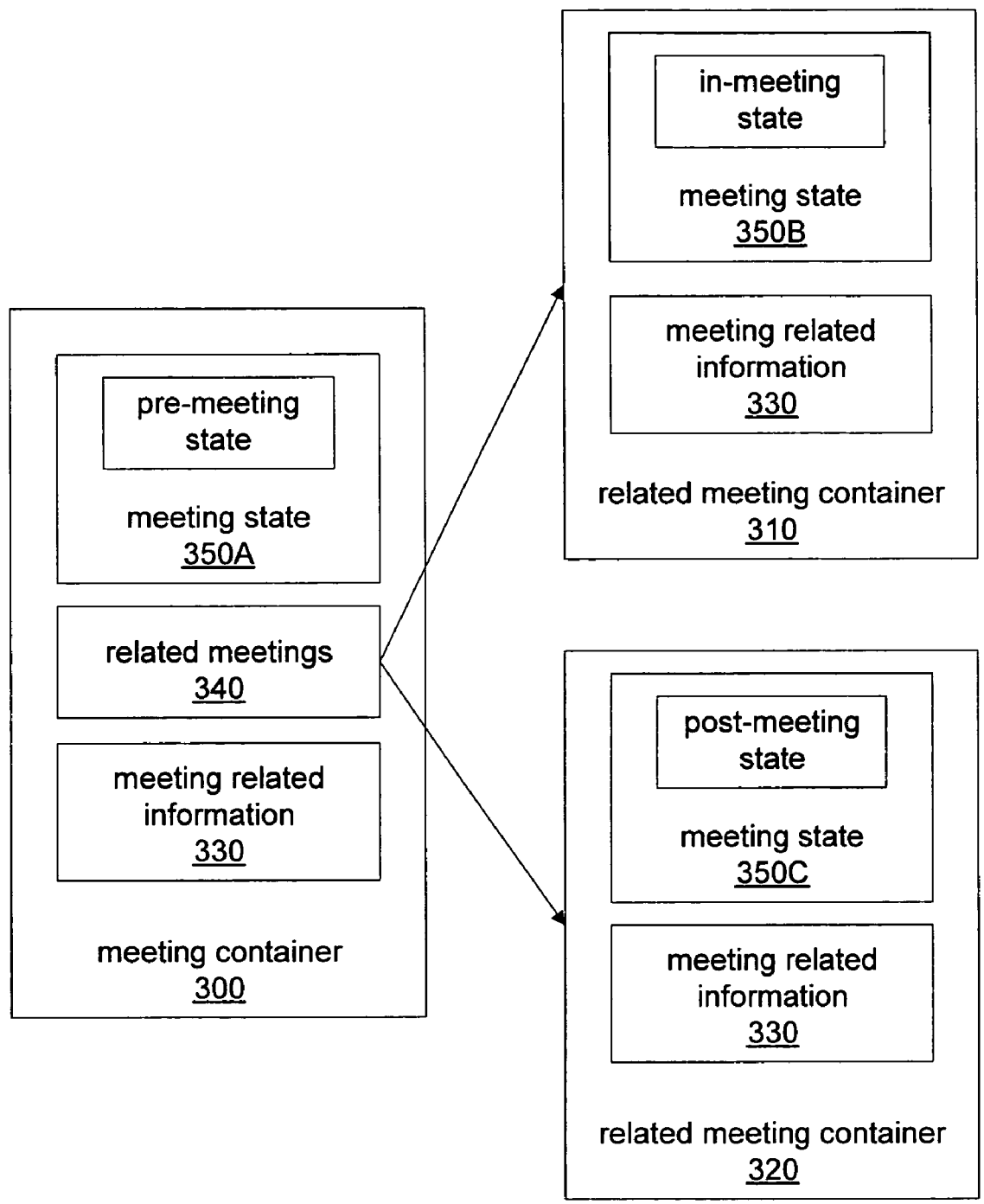
FIG. 3 is a block diagram illustrating three related meeting objects, in one embodiment.

For example, FIG. 3 is a block diagram illustrating three related meeting containers, according to one example embodiment. FIG. 3 includes meeting container 300 that includes meeting related information 330 regarding a meeting in a pre-meeting state, as illustrated by meeting state 350A of meeting container 300. The meeting information stored in meeting container 300 is related to two other meetings, information for each of which is stored in related meeting containers 310 and 320, respectively. As can be seen from FIG. 3, related meeting container 310 may store information for a meeting in an in-meeting state (i.e. the meeting is currently being held), while related meeting container 320 may store information for a meeting in a post-meeting state (i.e. the meeting has been held previously).

Meeting containers storing meeting related information for related meetings may be associated or linked in a manner corresponding to the relationship between the actual meetings. For example, meeting container 300 may include a reference to both related meeting containers 310 and 320, as is illustrated by related meetings 340 in FIG. 3. The actual meeting containers may be linked via any of various methods, according to different embodiments. For example, in one embodiment, each meeting container may be assigned a unique identifier, such as globally unique identifier or textual meeting name, that may be included in one meeting container allowing it to be associated with the referenced meeting container. Alternatively, in another embodiment, the meeting containers may all be stored in a single meeting container store or database, and related meetings may include a unique database identifier for related meetings. In some embodiments, meeting containers may be linked according to common meeting participants. As illustrated in FIG. 3, each related meeting may be in a different meeting phase. For example, meeting container 300 is in a pre-meeting, or planning, phase, while meeting containers 310 and 320 are in the in-meeting and post-meeting phases, as illustrated by meeting states 350B and 350C, respectively. The number of meeting containers linked to a related meeting is not limited in any manner.

The various instances of a meeting facilitation tool may communicate and interact together to ensure that all copies of a meeting container are up-to-date and represent a consistent view of the meeting related information stored in the meeting object. Thus, if the meeting coordinator updates the meeting agenda in meeting container 155 on server 180, meeting facilitation tool 120A may communicate those changes to the meeting facilitation tool 120C on client 135 and meeting facilitation tool 120C may update the meeting-related information stored in meeting container 170 on client 135.

Figure 4A:
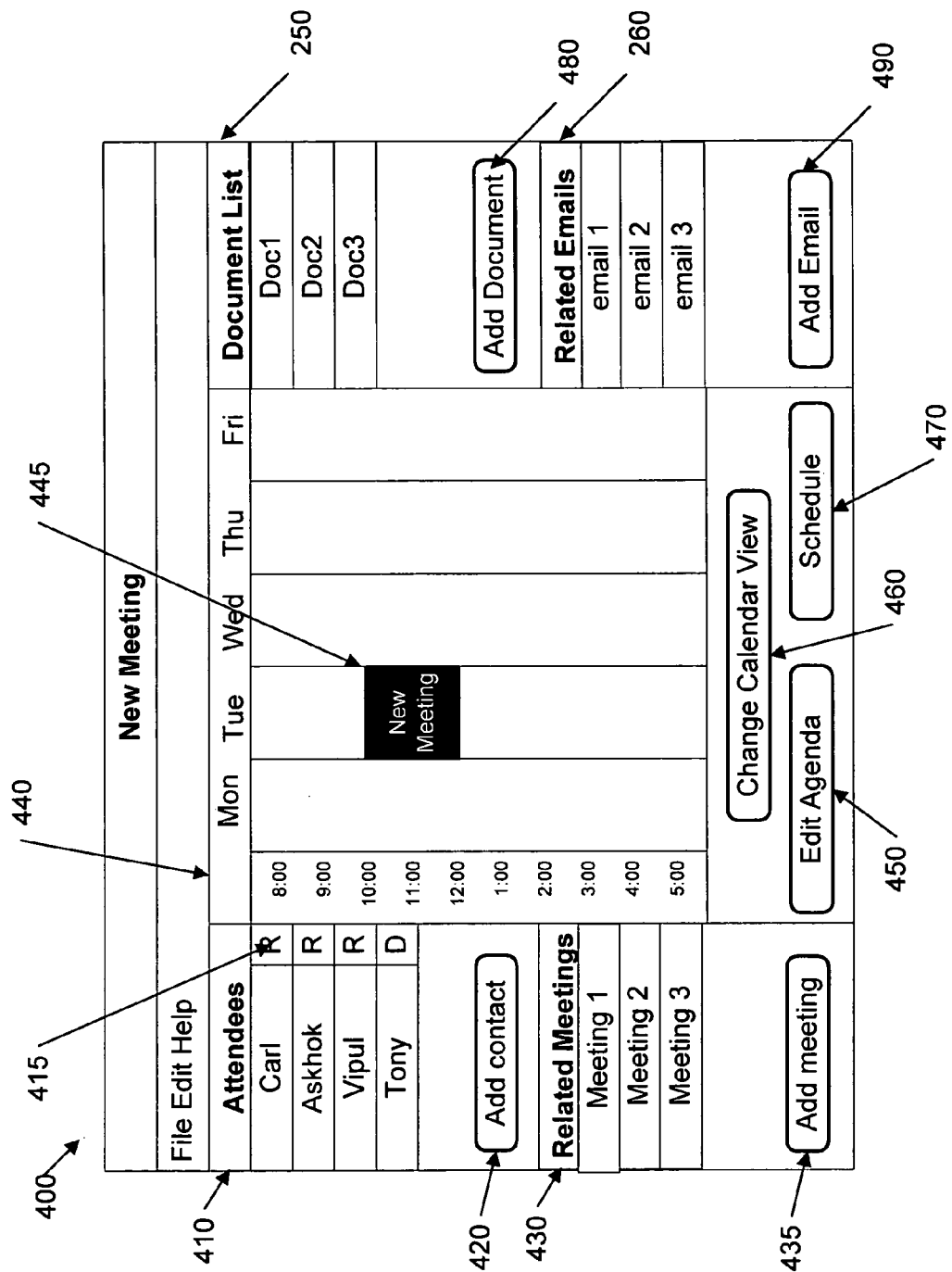
FIG. 4A illustrates an exemplary user interface of a meeting facilitation tool, according to one embodiment.

When planning and/or scheduling a new meeting, a meeting facilitation tool, such as meeting facilitation tool 120 may perform a number of pre-meeting activities. FIG. 4A illustrates an exemplary user interface 400 usable to input information for a new meeting via meeting facilitation tool 120, according to one embodiment. When planning a new meeting using a meeting facilitation tool, a user, such as a meeting coordinator may use a user interface, such as that displayed in FIG. 4A.

In some embodiments, user interface 400 may include various interface elements for inputting or specifying information related to various aspects of a new meeting. For instance, meeting facilitation tool 120 may display an attendee list 410 allowing the user to specify required and/or desired invitees for the new meeting. A user may add a new invitee to attendee list 410 by selecting "add contact" user interface element 420 that may, in turn, display another user interface for actually selecting or inputting contact information for a new invitee. Additionally, user interface 400 may include in attendee list 410 a user interface element 415 allowing a user to specify whether an invitee should be considered required or desired for the meeting. The current user may be automatically included as an invitee or attendee for a new meeting, in one embodiment. In other embodiments, however, the current user may not be automatically included as an invitee for a meeting the current user is defining/creating. For instance, a manager may want to schedule a meeting that he or she may not actually attend.

When scheduling a new meeting, meeting facilitation tool 120 may ensure that all required invitees are available during a scheduled meeting time, but may be configured to schedule a meeting for a time with one or more desired attendees are unavailable if no time can be determined during which all invitees (whether required or desired) are available. A similar interface may be presented by user interface 400 and/or meeting facilitation tool 120 for documents, emails and related meetings, as illustrated by document list 250 and add document user interface element 480, related email message list 260 and add email user interface element 490, and related meeting list 430 and add meeting user interface element 435, respectively. While user interface elements 420, 435, 480, and 490 are illustrated in FIG. 4A as push buttons, other types of interface elements, such as drop down select lists, may also be used in other embodiments.

Such a user interface may also include a calendar view, such as calendar view 440, that may display a potential meeting timeframe 445 for the new meeting. Calendar view 440 may be capable of several different views, such as a daily, weekly, or monthly view. For example, a user may change the current calendar view using change calendar view user interface element 460.

Meeting facilitation tool 120 may also include the ability to create or edit meeting related documents, such as a meeting agenda. Thus, a new meeting user interface may include edit agenda user interface element 450. In some embodiments, meeting facilitation tool 120 may have its own text editing capabilities for creating and editing meeting related documents, such as a meeting agenda. In other embodiments, however, meeting facilitation tool 120 may interact with (e.g. launch) a separate text processing application to allow the user to create/edit meeting related documents. In one embodiment, the actual text of a generated document, such as a meeting agenda, may be stored in a meeting container for the meetings, while in other embodiments, information in a meeting container may include a link, reference or shortcut to a meeting-related document, such as a meeting agenda.

When creating a new meeting, meeting facilitation tool 120 may allow a user to select a previously defined meeting as a starting point or baseline for the new meeting. In other words, information related to the previous meeting may be used as default information for the new meeting. For instance, Meeting facilitation tool 120 may include the invitees and/or attendees of a previous meeting in attendee list 410 for the new meeting. Similarly, a new meeting may be scheduled for the same day of the week and time of day as a previous meeting. Additionally, a new meeting may be associated or related to a previous meeting and/or those meetings related to the previous meeting, according to various embodiments. In general, any meeting related information from a previous meeting may be included with the meeting related information for a new meeting.

When planning a new meeting that is not based upon a previous meeting, meeting facilitation tool 120 may be configured to determine default values for various types of meeting related information. For example, meeting facilitation tool may automatically include contacts which have previously attended or been invited to the same meetings as the current user attended or was invited to. A user defining a new, meeting may, of course, change or add meeting related information to the default meeting information provided by meeting facilitation tool 120, whether or not that default meeting information was from a previous or related meeting. For example, other contacts may be added to the new meeting's attendee list. A meeting facilitation tool may be configured to allow selection of both required and desired invitees. In one embodiment, such specification may be utilized by meeting facilitation tool 120 when determining an appropriate time to hold the meeting, as will be discussed below.

Meeting facilitation tool 120 may also include a user interface element 470 for scheduling a new meeting. For example, after selecting invitees for a new meeting and after generating a meeting agenda, a user may select the schedule user interface element 470 to allow meeting facilitation tool 120 to automatically schedule the meeting with the specified invitees. For example, in one embodiment, meeting facilitation tool 120 may send a query to each invitee via any of various communication methods, according to various embodiments (e.g. email, instant messaging, automated voice, via telephony, etc). The tool may be configured to enable a preferred communication method for each contact. Alternatively it may allow a priority list of various communication methods to be defined or specified for each contact. Thus, one contact may be queried via email, while another via instant message. A meeting facilitation may be configured to determine contact information for an invitee in any of a number of manners. For example, in one embodiment, meeting facilitation tool 120 may be configured to allow a user to enter contact information for a contact, while in other embodiments, meeting facilitation tool may be configured to programmatically determine contact information by interacting with one or more contact or communication applications or frameworks.

Meeting queries and responses may be communicated using any of numerous communication mechanisms and/or techniques. For example, in one embodiment, meeting facilitation tool 120 may be configured to communicate via common messaging protocols, such as via email messages or instant messages. Alternatively in other embodiments, meeting facilitation tool 120 may be configured to communicate via a custom communication protocol, such as via custom TCP/IP messages. In general, meeting facilitation tool 120 may be configured to communicate via any suitable wired or wireless communication protocol, or via a combination of protocols. For instance, meeting facilitation tool 120 may communicate with certain meeting participants via one protocol, say via email messages, while also communicating with other participants via a different protocol, such as instant messages.

Queries and query responses may be automatically received, analyzed, and/or processed by meeting facilitation tool 120 to determine an appropriate time to hold a new meeting. Meeting facilitation tool 120 may include a proposed meeting time in a query to each invitee. The proposed time may be based on the meeting coordinator's current calendar view in the meeting facilitation tool 120. For instance, if the meeting coordinator is viewing a weekly calendar view, the tool may determine a time during the current week for the meeting. Similarly, if the meeting coordinator is viewing a monthly view, the tool may determine a time during the current month for the meeting. Alternatively, in other embodiments, the meeting coordinator may specify a time/date range within which the meeting should be held. Additionally, the meeting coordinator could specify the exact time for the meeting and that time would be included in query messages to invitees.

A meeting facilitation tool may receive query responses from invitees and those responses may include the times when that invitee is available within the proposed time range specified in the query. In one embodiment, the query message may be received by an instance of a meeting facilitation tool on the invitee's system that may programmatically determine the invitee's availability during the proposed meeting date/time, such as by accessing a local calendar application, and may automatically respond to the query with the invitee's availability. In another embodiments, availability information for one or more of the invitees may be available from a shared calendar database or application and thus, the coordinator's instance of meeting facilitation tool 120 may be able to determine a potential time for the meeting during which all invitees are likely to be available and may include the potential meeting schedule in a query message. Thus, in some embodiments, a meeting facilitation tool may be able to automatically determine a potential time when all invitees should be available before sending the query or invitation to each invitee. In other embodiments, however, the meeting facilitation tool may query each invitee to determine when they are available and use the invitees' responses to determine a time for the meeting before sending an actual invitation to invitees.

Additionally, the meeting tool may be able to interact with or access availability information for meeting related equipment and or meeting locations when determining an appropriate time for the meeting. For example, meeting facilitation tool 120 may be configured to determine the availability of conference rooms, projectors, video cameras, audio recorders, and other equipment either required or desired for a meeting. In one embodiment, a meeting coordinator may be able to specify in meeting facilitation tool 120 the location and equipment desired for a meeting. For example, in one embodiment, meeting facilitation tool 120 may treat such equipment and locations as another invitee for determining availability and/or scheduling information. For instance, an organization may maintain a calendar including the availability of such equipment and locations and meeting facilitation tool 120 may be configured to access availability information for a piece of equipment or a meeting location in the same manner as for an invitee.

Figure 4B:
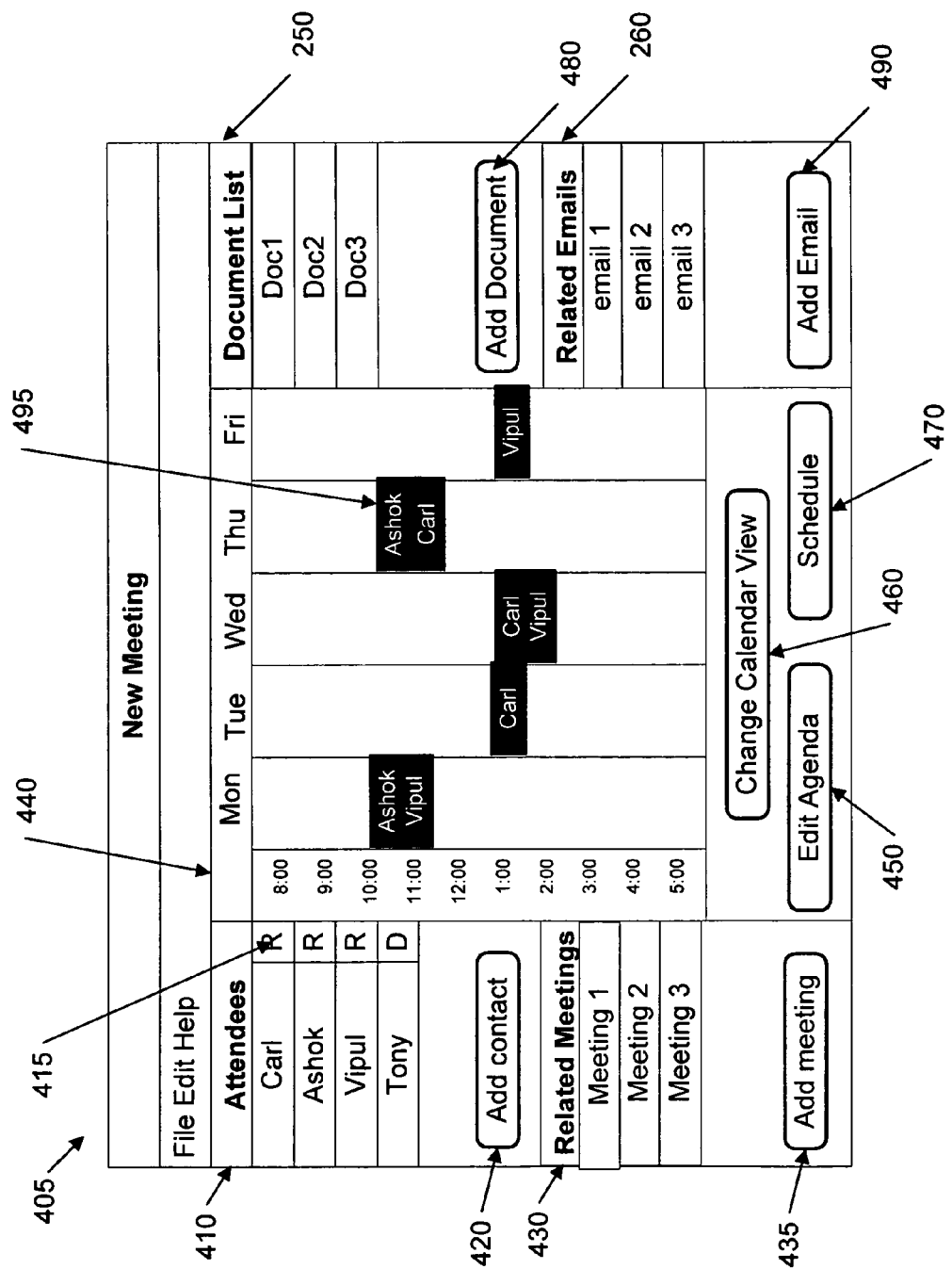
FIG. 4B illustrates another exemplary user interface of a meeting facilitation tool, according to one embodiment.

The availability for each invitee may, in some embodiments, be displayed on a calendar view of the coordinator's meeting facilitation tool such that the meeting coordinator may use the displayed availability information to select a time frame for the meeting. For example, FIG. 4B illustrates a user interface 405 similar to user interface 400 in FIG. 4A. User interface 405 includes a calendar view 440 that displays the times for which certain of the invitees are unavailable, as illustrated by user interface element 495. Alternatively, in some embodiments, user interface 405 may display times during which invitees are available, rather than when they are unavailable. In general, user interface 405 may be configured to allow a user to specify whether user interface 405 should display available or unavailable times for invitees. In one embodiment, meeting facilitation tool 120 may display only those invitees that have availability conflicts and may not display availability information for those invitees that do not have availability conflicts during the desired time frame in which the meeting should be scheduled.

After the meeting time and length have been determined (either programmatically or manually) meeting facilitation tool 120 may communicate with invitees to schedule the meeting. In one embodiment the meeting tool may electronically communicate with a calendar application, calendar database, or other database or service providing availability information for an invitee and record (or schedule) the meeting for the invitee. Alternatively, meeting facilitation tool 120 may send a message (e.g. email) to the invitee informing the invitee regarding the meeting schedule (and or other meeting related info). A meeting may be scheduled differently for different invitees, according to some embodiments. In certain embodiments, meeting facilitation tool 120 may communicate with another instance of meeting facilitation tool 120 executing on an invitee's machine, such as meeting facilitation tool 120B on client 130, and that instance of the meeting facilitation tool may record or schedule the meeting for the invitee, such as in a local calendar application, for example.

A meeting facilitation tool may allow the coordinator, or meeting planner, to select meeting related documents to be made available to meeting attendees via the meeting facilitation tool. For example, the coordinator's meeting facilitation tool may include certain documents in the meeting invitation message or may alternately include links to versions of those documents available via a network, such as via a LAN, WAN, or the internet. In yet other embodiments, a meeting facilitation tool may include a link to a meeting container that includes meeting related documents (among other meeting related information) and invitees may be able to access those documents (and possibly the other meeting related information) through their respective instances of meeting facilitation tool 120.

Meeting facilitation tool 120 may, in some embodiments, allow the coordinator (or another user) to define other meeting related information, such as a meeting agenda, that may be communicated (or otherwise made available) to meeting invitees. Additionally, a meeting planner may be able to assign various meeting related tasks to various invitee/participants via meeting facilitation tool 120 and the meeting facilitation tool 120 may communicate information regarding such tasks to the relevant meeting invitees.

Each invitee's instance of meeting facilitation tool 120 may be configured to receive and process meeting queries and invitations. For example, one invitee may desire to manually review all meeting queries/invitations. Thus, his instance of meeting facilitation tool 120 may display a window regarding each query/invitation allowing him to review information about the meeting and manually specify his availability and/or desire to attend. Alternatively, another invitee may have selected to have his instance of meeting facilitation tool 120 process meeting queries/invitees without user intervention. Thus, meeting facilitation tool 120 may receive a meeting query, determine and respond with availability information, and also receive and store any meeting related information (such as in a local meeting container) without any user action or intervention.

Each invitees' meeting facilitation tool may allow that invitee to view and browse all meeting related information regarding a meeting invitation, such as meeting schedule, agenda, documents, action items, related meetings, etc. The invitee may then determine whether or not to attend the meeting. Alternatively, the invitee may configure his meeting tool to accept all meeting invitations for a particular project, or that are called (or planned) by a particular person, or, in general, all meetings, according to various embodiments.

A meeting facilitation tool may, in some embodiments, dynamically process changes related to the meeting or meeting related information. For example, additionally invitees may be specified after the initial invitations have already been sent and the tool may send an invitation to the new invitee. If a meeting schedule or location needs to be changed, the meeting tool may automatically notify invitees regarding those changes. For instance, meeting facilitation tool 120 may automatically send an updated meeting agenda or other updated meeting related document to meeting invitees. As with the initial meeting queries and invitations, meeting facilitation tool 120 may alternatively store the relevant changes in a meeting container for the meeting and send a message to all invitees indicating that the meeting container includes updated information. In yet another embodiment, meeting facilitation tool 120 may send an updated meeting container or object to invitees.

After a new meeting has been defined and scheduled, meeting facilitation tool 120 may, in certain embodiments, be configured to automatically send reminder messages to all meeting invitees and/or participants. As when sending meeting queries and/or invitations, meeting facilitation tool 120 may send meeting reminders using any of various communication mechanisms and may send reminders to different invitees using different mechanisms. As noted above, meeting facilitation tool 120 may, in some embodiments, utilize a communication framework or service, such as an identity framework, to send meeting queries and invitations to meeting participants. For example, meeting facilitation tool 120 may communicate with an identity framework via an exposed API and request communication with various meeting participants and rely upon the identity framework to determine how to communicate with each participant.

Additionally, meeting facilitation tool 120 may, in some embodiments, be configured to send meeting reminders to some invitees using multiple communication mechanisms, such as via an email message and an instant message. Alternatively, meeting facilitation tool 120 may be configured to rely upon an invitee's instance of a meeting facilitation tool to automatically remind the invitee about upcoming meetings. For example, a participant's instance of meeting facilitation tool 120 may be configured to access and analyze shared meeting objects, containers, or MeetingSpaces to determine those meetings, if any, to which the participant to scheduled to attend and may remind the participant using any of a number of suitable notification mechanisms, such as via a pop up message box, email message, or instant message. In yet other embodiments, a meeting facilitation tool may programmatically communicate with a calendar program, such as via an API (or RMI protocol) exposed by the calendar program, for an invitee to configure the calendar program to automatically remind the invitee regarding an upcoming meeting.

Figure 5:
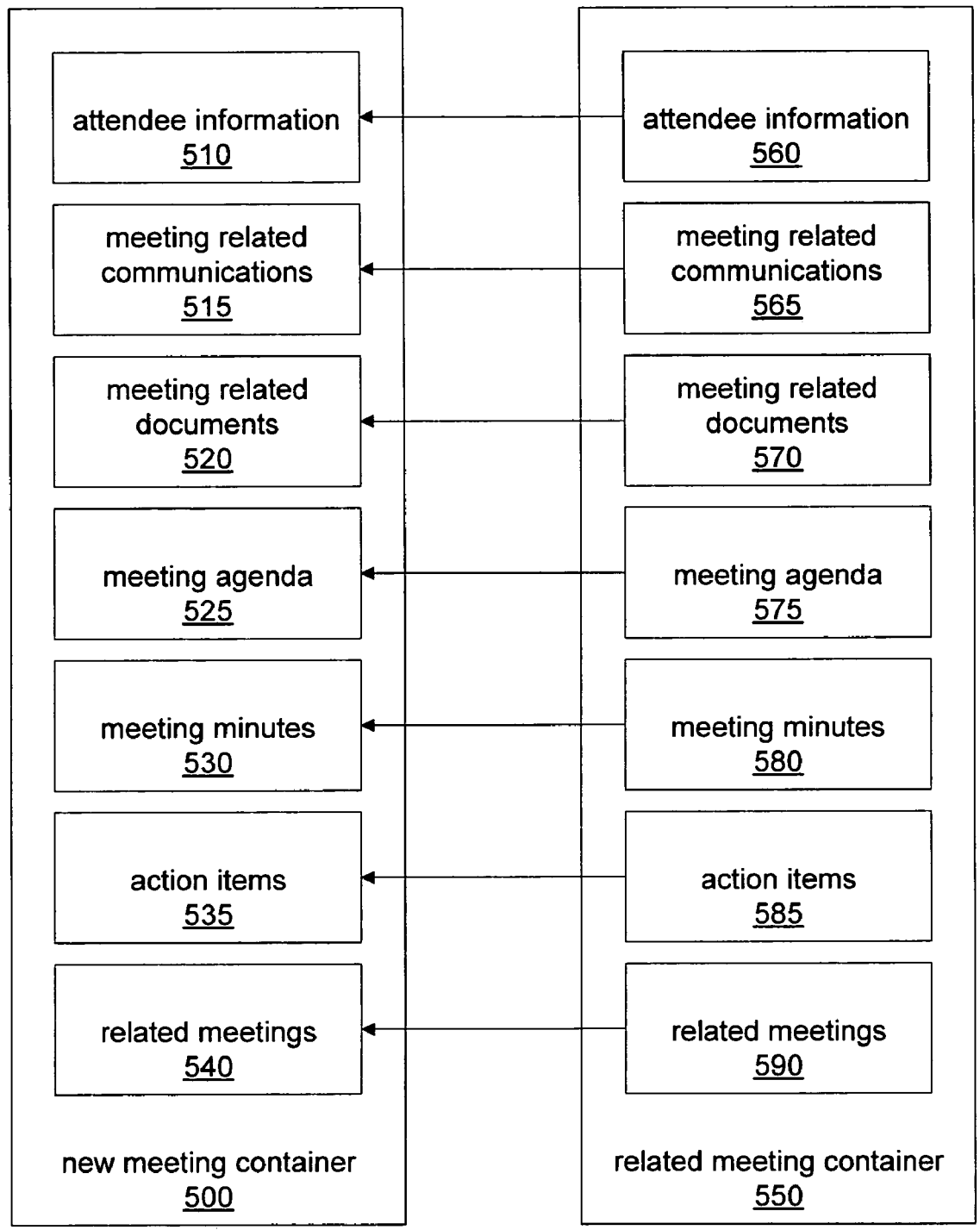
FIG. 5 is a block diagram illustrating a new meeting object including meeting related information from a different meeting object, according to one embodiment.

As noted above, a meeting facilitation tool may store and/or archive meeting related information in one or more meeting containers or MeetingSpaces. FIG. 5 is a block diagram illustrating two meeting containers or MeetingSpaces, new meeting container 500 and related meeting container 550. As discussed above, a new meeting may be based on another meeting. For instance, a follow up meeting may include meeting related information based on information regarding a previous meeting. In one embodiment, a new meeting may be based on an already finished previous meeting, while, in another embodiment, the new meeting may be based on a planned, but not yet held, meeting. Meeting related information for the previous meeting may be used as default information for the new meeting. For instance, new meeting container 500 may be for a follow-up meeting for the same project as the meeting associated with related meeting container 550. As is apparent from FIG. 5, a meeting container may store and/or archive various types of meeting-related information. For instance, both new meeting container 500 and meeting container 550 store attendee information, meeting related communications (such as email messages, instance messages, conference call notes and/or recordings), meeting related documents, meeting agendas, meeting minutes, action items, and indications or links to other, related, meetings. Please note that FIG. 5 represents only one possible embodiment and in other embodiments meeting containers may store, archive, make available, and/or share greater, fewer or different types of meeting related information.

When planning and/or scheduling a new meeting, a meeting facilitation tool, such as meeting facilitation tool 120, may be configured to use information regarding a previous meeting as default values for information regarding the new meeting. For example, in one embodiment, a user planning a new meeting may specify an earlier meeting to be used as a template for the new meeting. Thus, attendee information 510 may be copied from or based on attendee information 560. In some embodiments, meeting facilitation tool 120 may automatically copy all meeting invitees/attendees from related meeting container 550 to new meeting container 500. In other embodiments, however, meeting facilitation tool 120 may first display the meeting related information from related meeting container 550 and allow a user to select which meeting-related information from meeting container 550 should be used with the new meeting and, hence, copied to new meeting container 500. Similarly, meeting related communications 515, meeting related documents 520, meeting agenda 525, meeting minutes 530, action items 535, and related meetings 540 may be copied from or based on meeting related communications 565, meeting related documents 570, meeting agenda 575, meeting minutes 580, action items 585, and related meetings 590, respectively. Additionally, other meeting related information, such as time of day, location and any equipment required for the previous meeting, such as a video recorder and/or projector, may also be included in new meeting container 500 based on similar information from related meeting container 540.

When using information regarding a previous meeting as default information for a new meeting, meeting facilitation tool 120 may not copy the meeting related information directly. Instead, in some embodiments, the meeting related information from the previous meeting might be used as a template for generating similar information for the new meeting. For example, rather than directly copy the meeting agenda from the previous meeting to the new meeting, meeting facilitation tool 120 may use the previous meeting's agenda as a template for generating the meeting agenda for the new meeting. In some embodiments, meeting facilitation tool 120 may build a template for the new meeting's agenda based on the previous meeting's agenda and allow the meeting coordinator, or other meeting participant, to manually complete the new meeting's agenda. Similarly, meeting related information, such as actions items, for a new meeting may be initially based on action items from the previous meeting, but may also be customized by the meeting coordinator. For instance, meeting facilitation tool 120 may display the actions items from the previous meeting and allow the user to select those action items to be included with the new meeting.

Other meeting-related information, such as meeting related documents or related meetings, may, in some embodiments, be copied directly from related meeting container 550 to new meeting container 500. For example, if the new meeting is part of the same issue or project as the previous meeting, the same meeting related documents may be appropriate for both meetings. In general, when planning a new meeting based on a previous meeting, a meeting facilitation tool may be configured either to copy meeting related information directly from the previous meeting or to allow the user to specify which pieces of information from the previous meeting should be used in planning the new meeting, according to various embodiments.

Figure 6:
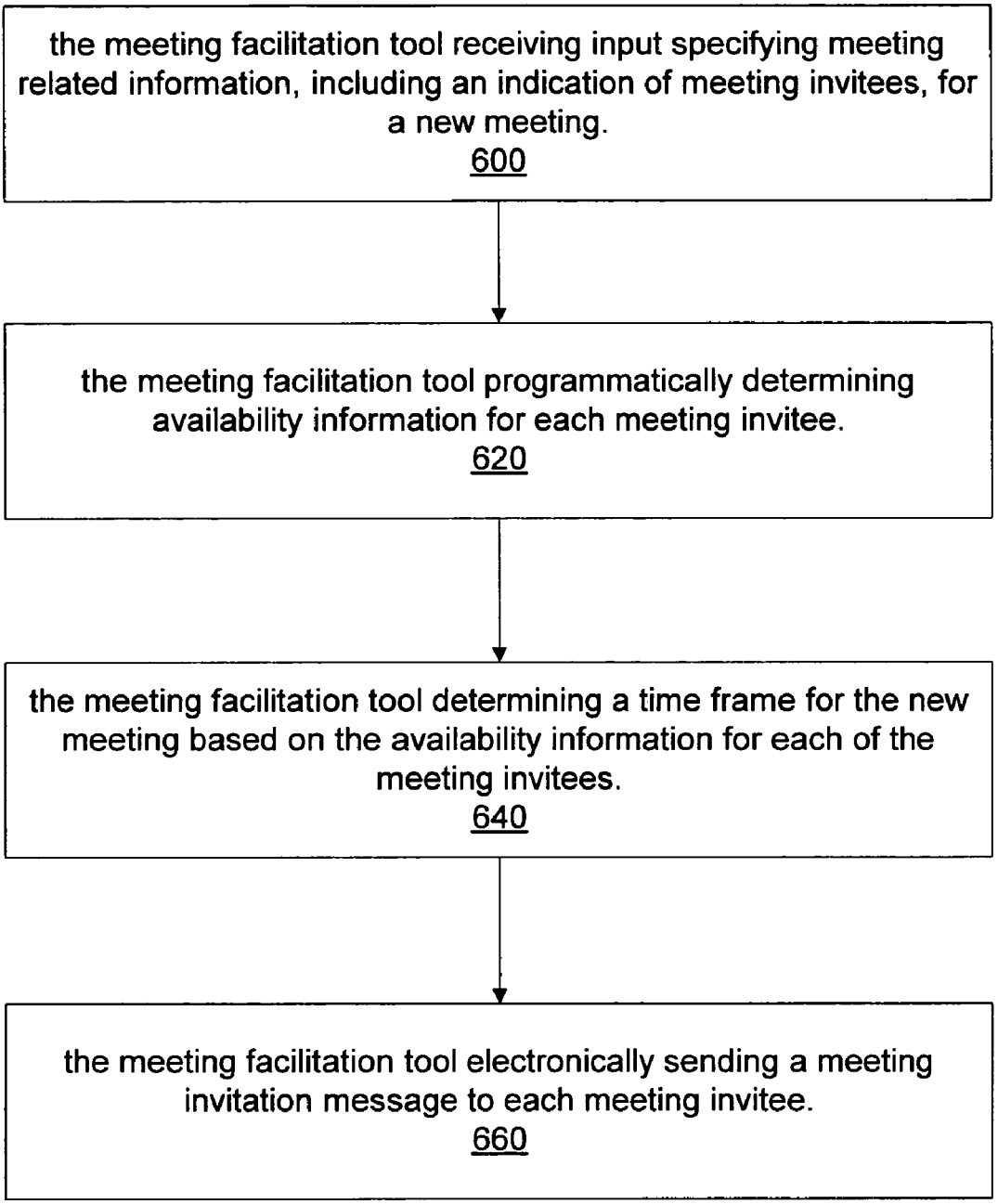
FIG. 6 is a flowchart illustrating one embodiment of a method for scheduling a new meeting.

Whether planning a new meeting from scratch or based on a previous meeting, a meeting facilitation tool may perform various aspects of meeting planning and scheduling, as described above. FIG. 6 is a flowchart illustrating one embodiment of a method for a meeting facilitation tool to perform meeting planning, scheduling, and/or other pre-meeting activities. For instance, a user, such as a meeting coordinator, may use meeting facilitation tool 120 to plan and schedule a new meeting. As described above, a user may specify various types of meeting related information, such as invitees, meeting related documents, email message, other related meetings, etc. Thus, as illustrated by block 600, meeting facilitation tool 120 may receive input specifying meeting related information, including information indicating one or more meeting invitees, for a new meeting. As noted above, the meeting related information might be specified in a number of different ways. For example, in one embodiment, a user may directly input the meeting related information, such as by typing in the names of meeting invitees, etc. In another embodiment, however, the user may instead select a previous meeting to be used as a template for the new meeting and meeting facilitation tool 120 may use information regarding the previous meeting as default information for the new meeting. For example, the attendees of the previous meeting may be included as invitees to the new meeting.

While in some embodiments, a meeting facilitation tool may receive user input specifying meeting related information, in other embodiments, a meeting facilitation tool may be configured to receive input programmatically from another meeting-related application or service specifying meeting related information for a new meeting. Thus, in some embodiments, meeting facilitation tool 120 may be interacted with, controlled by, or programmatically automated by another application or program.

After receiving the input specifying the meeting related information, meeting facilitation tool 120 may programmatically schedule a time for the new meeting by first programmatically determining availability information for each of the meeting invitees, as illustrated by block 620. As noted above, meeting facilitation tool 120 may determine the availability for each meeting invitee using any of a number of different mechanisms. For instance, in one embodiment, meeting facilitation tool 120 may send a message, such as an email message or instance message, to an invitee requesting the invitee's availability information. Alternatively, in another embodiment, meeting facilitation tool 120 may be configured to programmatically access calendar data, either stored locally or shared remotely, for a meeting invitee. In yet another embodiment, meeting facilitation tool 120 may be configured to communicate with a calendar application for an invitee to obtain availability information.

After determining the availability for each meeting invitee, meeting facilitation tool 120 may determine a time frame for a new meeting based on the availability information for each meeting invitee, as illustrated by block 640. For instance, meeting facilitation tool 120 may analyze the availability information for each invitee to determine a time frame during which all invitees are available. Alternatively, in another embodiment, meeting facilitation tool 120 may be configured to display the availability information for the invitees in order allow a user, such as a meeting coordinator, to manually select a time frame for holding the meeting. If meeting facilitation tool 120 determines that there is no possible time frame during which all meeting invitees are available, meeting facilitation tool 120 may send messages to one or more of the invitees requesting that one or more invitees make themselves available during a particular time frame in order to be able to attend the new meeting.

Additionally, meeting facilitation tool 120 may be configured to use a current calendar view selected by the user when determining a time frame for the new meeting. For example, if the user is currently using a weekly calendar view meeting facilitation tool 120 may be configured to determine a time for the new meeting during the current week. Similarly, if the user is currently using a monthly calendar view, meeting facilitation tool 120 may determine a time for the new meeting during the current month. Alternatively, in some embodiments, meeting facilitation tool 120 may be configured to allow a user to specify a date range during which to schedule a new meeting. Thus, in one example embodiment a user may specify that a new meeting be scheduled to occur within the next 14 days.

After a time frame for the new meeting has been determined, meeting facilitation tool 120 may electronically send a meeting invitation message to each meeting invitee, as illustrated by block 660. Meeting invitation messages may be communicated to a meeting invitee via any suitable communication mechanism or channel, including, but not limited, email messages, instant messages, voice messages, custom TCP/IP messages, etc.

Additionally, in some embodiments, meeting facilitation tool 120 may be configured to update calendar data for a meeting invitee in addition to or instead of sending a meeting invitation. For instance, meeting facilitation tool 120 may communicate with a calendar application for a meeting invitee to schedule a new meeting with the invitee. For example, in one embodiment, meeting facilitation tool may be configured to access and update calendar data in a common, shared calendar database. In another embodiment, meeting facilitation tool 120 may be configured to access a calendar application (or service) for the attendee and programmatically update the calendar data, via an exposed interface of the calendar application (or service). Meeting facilitation tool 120 may in some embodiments rely upon such a calendar application to inform the invitee of the new meeting. In other embodiments, however, meeting facilitation tool 120 may also send a meeting invitation to the invitee in addition to scheduling a new meeting with a calendar application for the invitee.

In some embodiments, a meeting invitee may also be using an instance of meeting facilitation tool 120 and the meeting coordinator's instance of meeting facilitation tool 120 may communicate with the invitee's instance of meeting facilitation tool 120 regarding an invitation to a new meeting. In response, the invitee's instance of meeting facilitation tool 120 may inform the invitee regarding the new meeting, or may alternatively, process the invitation without user action, such as by communicating with a local calendar program to schedule the new meeting.

Figure 7:
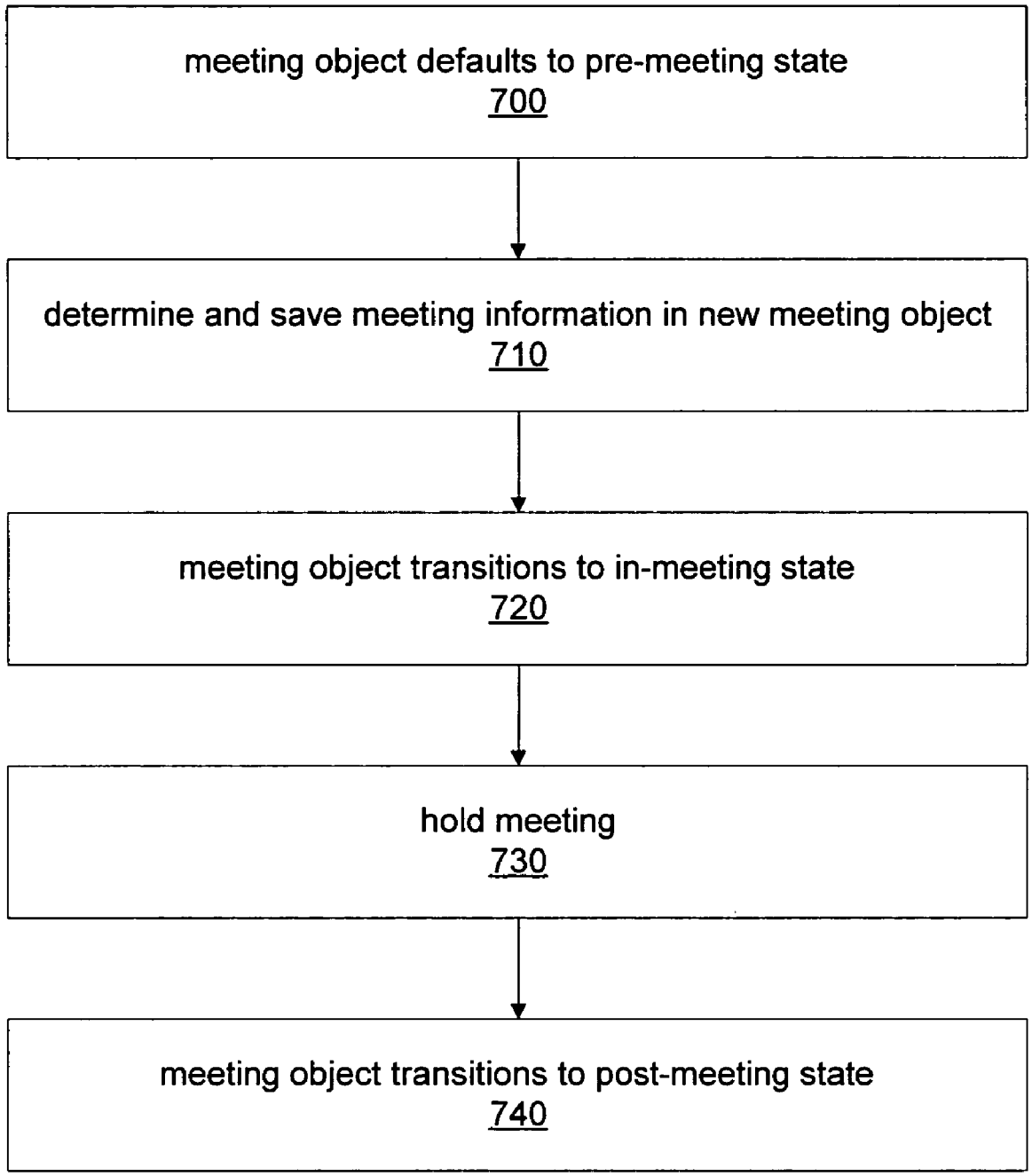
FIG. 7 is a flowchart illustrating one embodiment of a method for using meeting objects.

As noted above, meeting facilitation tools may store and/or archive meeting related information in meeting containers. FIG. 7 is a flowchart illustrating one embodiment of a method for using a meeting container, as illustrated herein. For instance, a meeting coordinator may use meeting facilitation tool 120 to plan a new meeting. In response, meeting facilitation tool 120 may create a new meeting container and the meeting container may default to a pre-meeting state, as illustrated by block 700. After planning the meeting, such as determining the meeting invitees, agenda, etc., the meeting coordinator may record such information using meeting facilitation tool 120. Meeting facilitation tool 120 may then save meeting related information in the new meeting container, as illustrated by block 710. When the appropriate meeting-related information has been stored in the meeting container and when any pre-meeting activities or tasks have been completed and indications of their completion are stored in the meeting container and when the scheduled meeting time arrives, the meeting container may transition to an in-meeting state, as illustrated by block 720. The meeting participant may hold the meeting with the aid of meeting facilitation tool, as described above, and illustrated by block 730. After completion of the meeting itself, the meeting container may transition to a post-meeting state, as illustrated by block 740.

FIG. 8 is a flowchart illustrating one embodiment of a method for planning a new meeting based upon related meetings. For example, meeting facilitation tool 120 may display meeting related information for other meetings related to a new meeting, as illustrated by block 800. For instance, a user may have started to plan a new meeting and may be indicated that the new meeting should be related to previous meeting on the same topic or project. Meeting facilitation tool 120 may display various pieces of information for the previous meetings, such as the attendees, the agenda, email messages related to the meetings, documents related to the meetings, etc. The user may then select various pieces of meeting related information for one the related meetings. In response to receiving user input selecting meeting related information for one or more of the other meetings, as illustrated by block 820, meeting facilitation tool 120 may include information indicating the selected meeting related information in the meeting related information for the new meeting, as illustrated by block 840.

Figure 9:
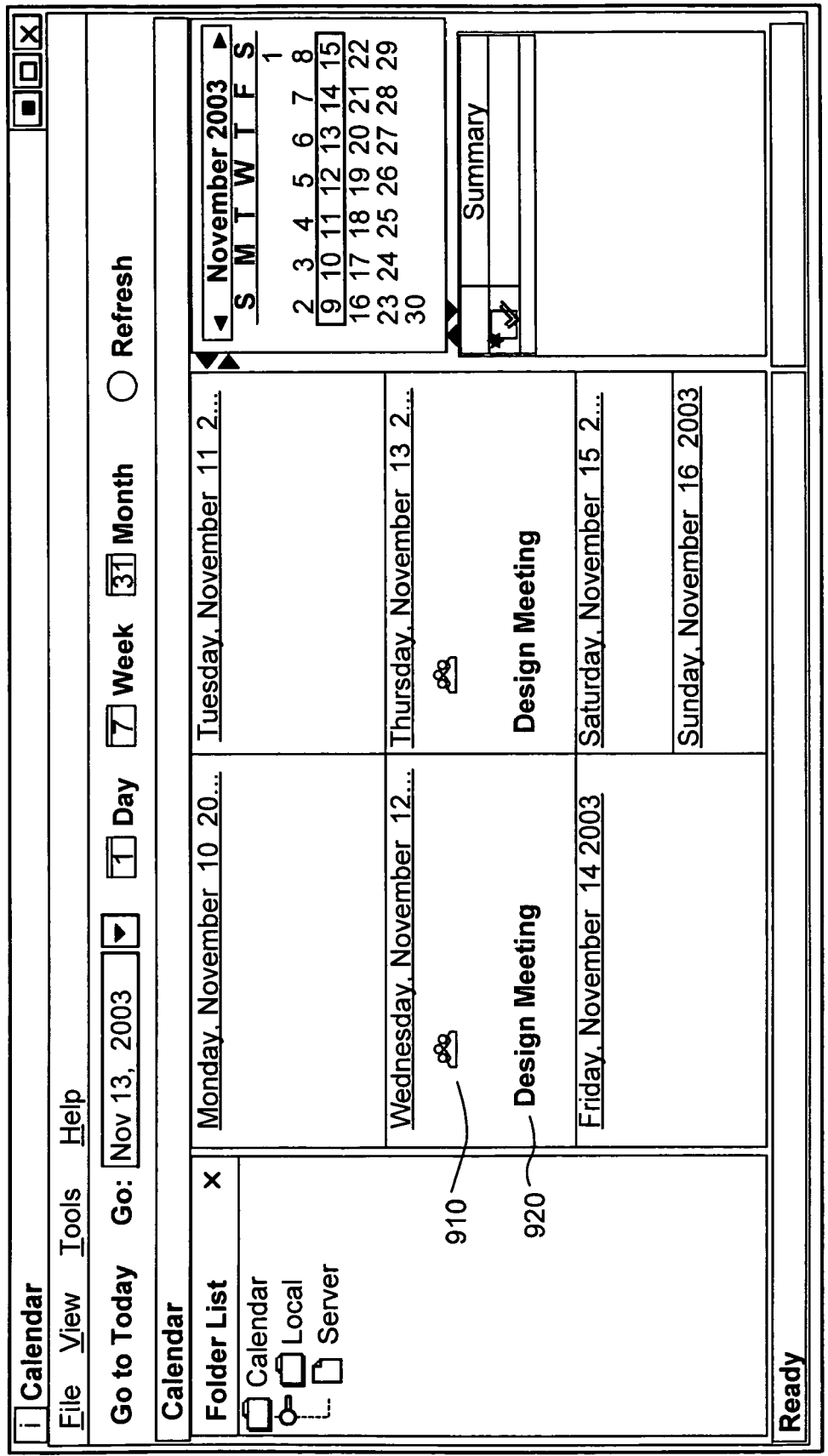
FIG. 9 illustrates an exemplary user interface for a calendar that includes scheduled meetings, according to one embodiment.

FIG. 9 illustrates an exemplary user interface 900 for a calendar that includes scheduled meetings, according to one embodiment. For example, user interface 900 may be part of meeting facilitation tool 120 or may alternately be part of a separate calendar application that is either meeting aware or capable or associating a scheduled event with a meeting or meeting container. As described above, meeting facilitation tool 120 may be configured to communicate and/or interact with calendar applications to record or schedule a meeting and the calendar application may display schedule meetings. For instance, user interface 900 includes an indication 920 of a two-day scheduled design meeting. In some embodiments, selecting the displayed indication 920 of a scheduled meeting may cause user interface 900 or the underlying application, such as a calendar application or meeting facilitation tool 120, to display information regarding the meeting, such as meeting date/time, scheduled duration, location, attendees, etc.

Additionally, user interface 900 may also include an indication 910, such as an icon, for a meeting container including meeting-related information for a meeting. Selecting, such as by clicking with a mouse, indication 910 may, in some embodiments, cause a new user interface to be displayed including the meeting-related information from the meeting container associated with the meeting. For example, in one embodiment, a calendar program displaying user interface 900 may be meeting aware, that is it may know how to access and display meeting-related information from a meeting container or may be able to launch an instance of a meeting facilitation tool and instruct the meeting facilitation tool to load and display the meeting-related information from a particular meeting container or for a particular meeting. Thus, meeting facilitation tool 120 may interoperate with various calendar applications to provide a seamless user interface for user to review information regarding scheduled meetings.

Figure 10:
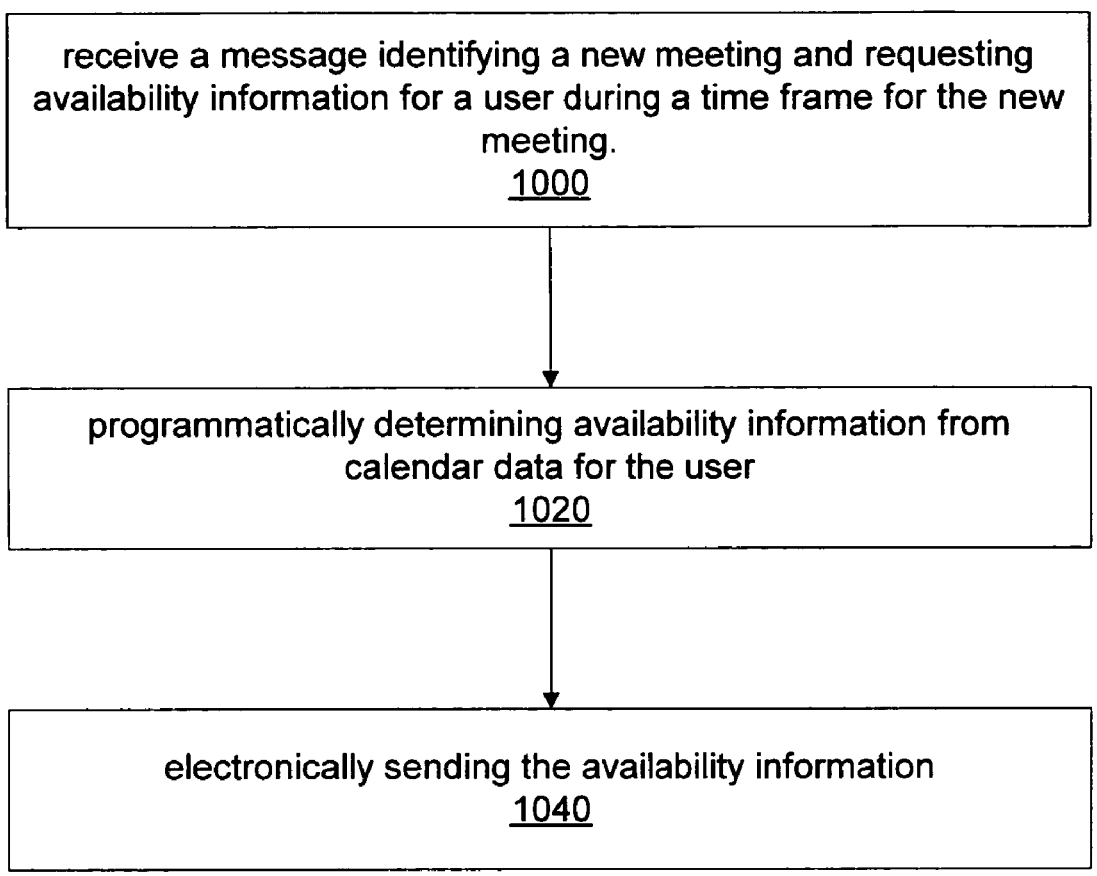
FIG. 10 is a flowchart illustrating one embodiment of a method for programmatically supplying the availability of a meeting invitee to a meeting facilitation tool.

FIG. 10 is a flowchart illustrating one embodiment of a method for a meeting facilitation tool to respond to a meeting query or meeting invitation message. A meeting facilitation tool for a meeting invitee may receive a message identifying a new meeting and requesting availability information for the invitee during a potential time frame for the new meeting, as illustrated by block 1000. In response to receiving such a meeting query message identifying a new meeting time and requesting availability information during a potential time frame for the new meeting, a meeting facilitation tool for an invitee may programmatically determine availability information from any of various sources of availability information for the user, such as calendar data, as illustrated by block 1020. For instance, in one embodiment, a meeting facilitation tool may be configured to ask the invitee (user) to manually enter whether or not the invitee is available during the specified time frame. In another embodiment, the meeting facilitation tool may be configured to programmatically determine the availability information, such as by programmatically requesting it from a calendar application or service storing availability and/or appointment information for the invitee. In yet other embodiments, the meeting facilitation tool may be configured to programmatically access or interact with a framework or service, such as an identity framework described above, to obtain availability information for a user. As noted above, an identity framework may be configured to store, manage, and provide identity, availability and reachability information for various users. After determining availability information for the invitee during the specified time frame of the new meeting, the meeting facilitation tool may electronically send it to the requesting meeting facilitation tool, as illustrated by block 1040.

Figure 11:
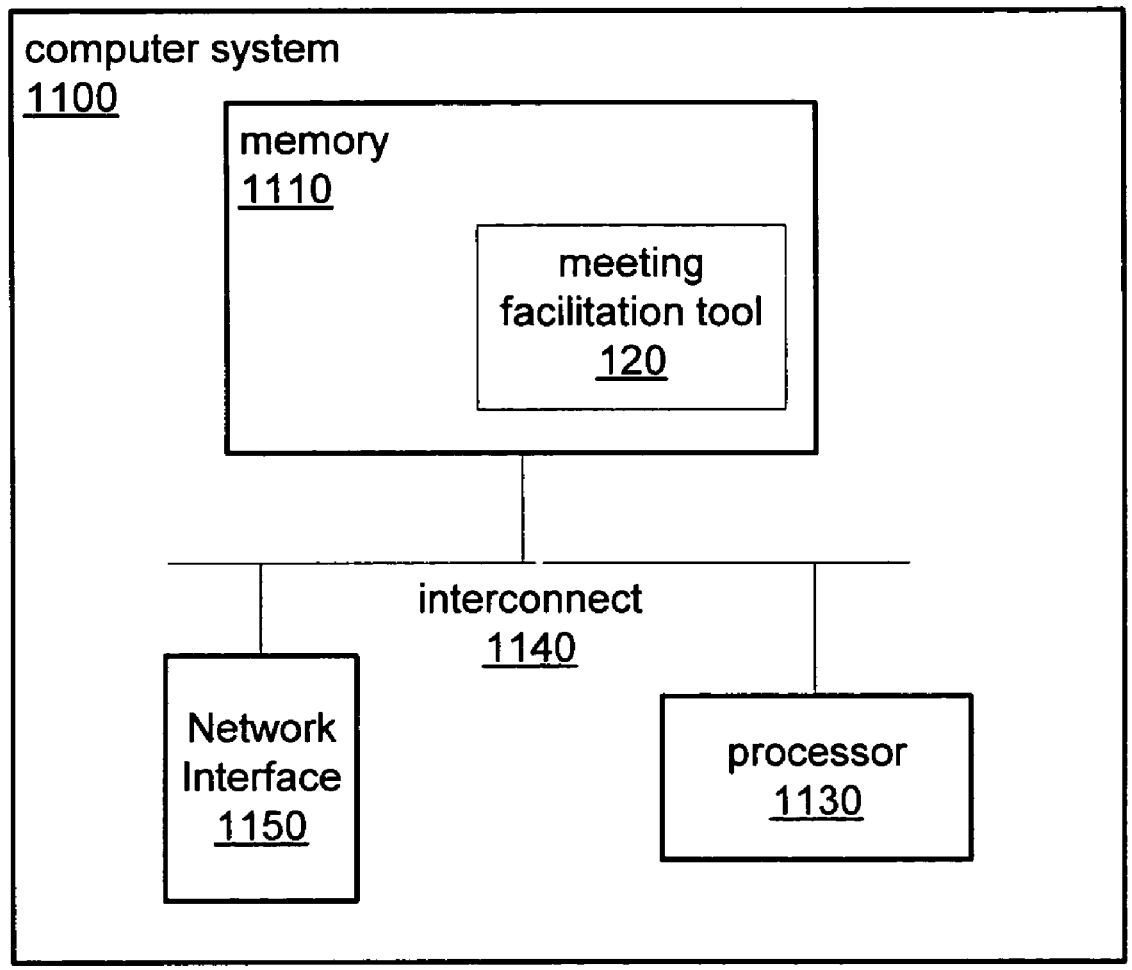
FIG. 11 is a block diagram illustrating a computer system suitable for implementing a meeting facilitation tool and/or meeting objects, as described herein, according to one embodiment.

FIG. 11 illustrates a computing system capable of implementing a meeting facilitation tool, as described herein and according to various embodiments. Computer system 1100 may be any of various types of devices, including, but not limited to, a personal computer system, desktop computer, laptop or notebook computer, mainframe computer system, handheld computer, workstation, network computer, a consumer device, or any type of networkable peripheral device such as storage devices, switches, modems, routers, etc, or in general any type of networkable computing device. Computer system 1100 may include at least one processor 1130. Processor 1130 may couple across interconnect 1140 to memory 1110.

Memory 1110 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 1110 may include program instructions configured to implement meeting facilitation activities and meeting containers, as described herein. In certain embodiments memory 1110 may include program instructions configured to implement a meeting facilitation tool, such as meeting facilitation tool 120. In such embodiments, meeting facilitation tool 120 may include program instructions configured to implement pre-meeting, in-meeting, and post-meeting activities, as described herein. A meeting facilitation tool may be implemented in any of various programming languages or methods. For example, in one embodiment, meeting facilitation tool 120 may be JAVA based, while in another embodiments, meeting facilitation tool 120 may be implemented using HTML and web browser technology. In other embodiments, meeting facilitation tool 120 may be written using the C or C++programming languages. In some embodiments, meeting facilitation tools development and implemented using different technologies may be configured to communicate and interact with each other, thereby possibly allowing different users and/or different organizations to use different development technologies.

Although the embodiments above have been described in detail, numerous variations and modifications will become apparent once the above disclosure is fully appreciated. It is intended that the following claims be interpreted to embrace all such variations and modifications.

What is claimed is:

1. A device, comprising:
   a processor; and
   a memory coupled to the processor, wherein the memory comprises program instructions configured to implement a meeting facilitation tool, wherein the meeting facilitation tool is configured to:
   receive user input specifying information regarding a new meeting, wherein the information comprises one or more meeting invitees;
   programmatically determine available information for each of the meeting invitees;
   determine a time frame for the new meeting based on availability information for each of the meeting invitees;
   send a meeting invitation message to each of the meeting invitees; and
   store an indication of a current meeting state of the new meeting in a respective one of one or more shared meeting computer program objects configured to transition among a plurality of meeting states;
   wherein each of the one or more shared meeting computer program objects stores meeting state information for a single, distinct meeting, and is accessible by two or more meeting-aware applications or instances thereof to determine the current meeting state; and
   wherein each of the plurality of meeting states corresponds to a distinct phase of the new meeting during which one or more meeting related activities are to be performed for the new meeting, and wherein the plurality of meeting states comprises two or more of: a pre-meeting state, an in-meeting state, and a post-meeting state.

2. The device of claim 1, wherein the meeting facilitation tool is further configured to programmatically update availability data for each attendee to indicate the new meeting during the time frame.

3. The device of claim 1, wherein the respective shared meeting computer program object is further configured to store an aggregation of multiple types of meeting related information, wherein the meeting facilitation tool is further configured to store the meeting related information for the new meeting in the respective shared meeting computer program object.

4. The device of claim 1, wherein, in programmatically determining availability information, the meeting facilitation tool is configured to programmatically obtain availability information from availability data for each of the meeting invitees.

5. The device of claim 4, wherein the meeting facilitation tool is further configured to obtain the availability information for one or more of the invitees from an availability framework configured to maintain and supply aggregated availability information for a plurality of users.

6. The device of claim 4, wherein, in programmatically obtaining availability information, the meeting facilitation tool is configured to load availability information for one or more of the invitees from a respective calendar information database for each of the one or more of the invitees.

7. The device of claim 4, wherein, in programmatically obtaining availability information, the meeting facilitation tool is further configured to load calendar data for one or more of the invitees from a distributed calendar database, wherein the distributed calendar database maintains calendar data for a plurality of users across a plurality of computing nodes.

8. The device of claim 4, wherein, in programmatically obtaining availability information, the meeting facilitation tool is further configured to load calendar data for the one or more of the invitees from a central calendar database, wherein the central calendar database maintains calendar information for a plurality of users.

9. The device of claim 1, wherein the meeting facilitation tool is further configured to:
   display one or more other user interface elements indicating the availability information for one or more of the one or more meeting invitees; and
   wherein, in programmatically determining a time frame for the new meeting, the meeting facilitation tool is configured to receive user input specifying the time frame based upon the indicated availability information.

10. The device of claim 1, wherein the meeting facilitation tool is further configured to display one or more user interface elements indicating meeting related information for one or more other meetings related to the new meeting.

11. The device of claim 10, wherein the meeting facilitation tool is further configured to include meeting related information for one or more of the other meetings in the meeting related information for the new meeting.

12. The device of claim 11, wherein the meeting facilitation tool is further configured to include one or more meeting attendees for one or more of the other meetings in the meeting related information for the new meeting.

13. The device of claim 11, wherein the meeting facilitation tool is further configured to include one or more documents indicated in the meeting related information for one or more of the other meetings in the meeting related information for the new meeting.

14. The device of claim 11, wherein the meeting facilitation tool is further configured to include one or more email messages indicated in the meeting related information for one or more of the other meetings in the meeting related information for the new meeting.

15. The device of claim 1, wherein the meeting related information indicates one or more documents for the meeting.

16. The device of claim 1, wherein the meeting related information indicates one or more emails related to the new meeting.

17. The device of claim 1, wherein, in programmatically determining availability information, the meeting facilitation tool is configured to programmatically query one or more of the one or more meeting invitees for their respective availability information.

18. The device of claim 17, wherein, in programmatically querying, the meeting facilitation tool is configured to send an email message to the one or more queried meeting invitees.

19. The device of claim 18, wherein the meeting facilitation tool is further configured to receive a respective response from one or more of the one or more queried meeting invitees, wherein each response includes availability information for the corresponding queried meeting invitee.

20. The device of claim 1, wherein the meeting related information comprises one or more action items for the new meeting to be performed in a pre-meeting phase of the new meeting.

21. The device of claim 1, wherein the meeting facilitation tool is further configured to electronically send a meeting reminder message to each of the meeting invitees prior to a start of the new meeting.

22. The device of claim 1, wherein the meeting facilitation tool is further configured to:
receive user input modifying the meeting related information regarding the new meeting; and
electronically send a message to each meeting invitee indicating the modified meeting related information.

23. A method, comprising:
using a computer to perform:
receiving input specifying meeting related information for a new meeting, wherein the meeting related information comprises information indicating one or more meeting invitees;
programmatically determining available information for each of the one or more meeting invitees;
determining a time frame for the new meeting based on the availability information for each of the one or more meeting invitees;
sending an electronic meeting invitation message to each of the one or more meeting invitees; and
storing an indication of a current meeting state of the new meeting in a respective one of one or more shared meeting computer program objects configured to transition among a plurality of meeting states;
wherein each of the one or more shared meeting computer program objects stores meeting state information for a single, distinct meeting, and is accessible by two or more meeting-aware applications or instances thereof to determine the current meeting state; and
wherein each of the plurality of meeting states corresponds to a distinct phase of the new meeting during which one or more meeting related activities are to be performed for the new meeting, and wherein the plurality of meeting states comprises two or more of: a pre-meeting state, an in-meeting state, and a post-meeting state.

24. The method of claim 23, further comprising using the computer to perform storing the meeting related information for the new meeting in the respective shared meeting computer program object, wherein the respective shared meeting computer program object is configured to store an aggregation of multiple types of meeting related information.

25. The method of claim 23, wherein said programmatically determining availability information comprises obtaining availability information from availability data for each of the meeting invitees.

26. A computer readable storage medium, storing program instructions executable to implement:
a meeting facilitation tool receiving user input specifying information regarding a new meeting, wherein the information comprises one or more meeting invitees;
the meeting facilitation tool programmatically determining available information for each of the meeting invitees;
the meeting facilitation tool determining a time frame for the new meeting based on availability information for each of the meeting invitees;
the meeting facilitation tool electronically sending a meeting invitation messages to each of the meeting invitees; and
the meeting facilitation tool storing an indication of a current meeting state of the new meeting in a respective one of one or more shared meeting computer program objects configured to transition among a plurality of meeting states;
wherein each of the one or more shared meeting computer program objects stores meeting state information for a single, distinct meeting, and is accessible by two or more meeting-aware applications or instances thereof to determine the current meeting state; and
wherein each of the plurality of meeting states corresponds to a distinct phase of the new meeting during which one or more meeting related activities are to be performed for the new meeting, and wherein the plurality of meeting states comprises two or more of: a pre-meeting state, an in-meeting state, and a post-meeting state.

27. The computer accessible medium of claim 26, wherein the program instructions are further configured to implement the meeting facilitation tool storing the meeting related information for the new meeting in the respective shared meeting computer program object, and wherein the respective shared meeting computer program object is configured to store an aggregation of multiple types of meeting related information.

28. The computer accessible medium of claim 26, wherein in programmatically determining availability information, the program instructions are further configured to implement the meeting facilitation tool programmatically obtaining availability information from availability data for each of the meeting invitees.

* * * * *